(12) United States Patent
Sisto

(10) Patent No.: US 12,232,666 B2
(45) Date of Patent: Feb. 25, 2025

(54) ADJUSTABLE HOLDER FOR A FLUID DISPENSING CONTAINER

(71) Applicant: Salto, LLC, Philadelphia, PA (US)

(72) Inventor: Salvatore Sisto, East Brunswick, NJ (US)

(73) Assignee: Salto, LLC

( * ) Notice: Subject to any disclaimer, the term of this patent is extended or adjusted under 35 U.S.C. 154(b) by 0 days.

(21) Appl. No.: 18/205,771

(22) Filed: Jun. 5, 2023

(65) Prior Publication Data

US 2023/0397777 A1 Dec. 14, 2023

Related U.S. Application Data

(60) Provisional application No. 63/350,477, filed on Jun. 9, 2022.

(51) Int. Cl.
*A47K 5/12* (2006.01)
*F16B 2/10* (2006.01)

(52) U.S. Cl.
CPC .............. *A47K 5/1205* (2013.01); *F16B 2/10* (2013.01); *A47K 2201/02* (2013.01)

(58) Field of Classification Search
CPC .... A47K 5/1205; A47K 2201/02; A47K 5/12; A47K 2201/00; A47K 2201/025; F16B 2/10; F16B 2/12; F16L 3/1091; B65D 23/001; B65D 23/003; B60N 3/106
USPC ...................................... 248/311.2, 312–313
See application file for complete search history.

(56) References Cited

U.S. PATENT DOCUMENTS

| | | | | |
|---|---|---|---|---|
| 3,643,813 | A * | 2/1972 | Noonan ................. | A47B 73/00 211/75 |
| 5,586,800 | A * | 12/1996 | Triplett ................ | A47D 1/0085 297/148 |
| 6,041,974 | A * | 3/2000 | Poitras ..................... | A47K 5/12 222/173 |
| 8,308,407 | B2 * | 11/2012 | Praud ........................ | B60P 7/12 410/36 |
| 9,155,428 | B2 | 10/2015 | Haworth | |
| 11,357,365 | B2 | 6/2022 | Li | |
| 2018/0153354 | A1 * | 6/2018 | Beckerman ......... | B05B 11/0054 |

(Continued)

FOREIGN PATENT DOCUMENTS

CN 203802349 U 9/2014
CN 106923720 U 7/2017

(Continued)

*Primary Examiner* — Christopher Garft
(74) *Attorney, Agent, or Firm* — BELLES KATZ LLC

(57) ABSTRACT

An adjustable holder configured to support a fluid dispensing container. The adjustable holder may include a clamp portion and a locking assembly. The clamp portion may include a first part and a second part, with the second part being movable relative to the first part. The first and second parts may include first and second locking channels. The locking assembly may include a connection member that is located within the first and second locking channels and a locking member. The locking member may be alterable between a locked state and an unlocked state, such that the first part of the clamp is movable relative to the second part of the clamp portion when the locking member is in the unlocked state. The first part may be movable relative to the second part between an open state and a closed state.

19 Claims, 19 Drawing Sheets

(56) References Cited

U.S. PATENT DOCUMENTS

| | | | | |
|---|---|---|---|---|
| 2022/0007897 A1* | 1/2022 | Rossi | ................... | A47K 5/1205 |
| 2022/0033141 A1* | 2/2022 | Brenner | ............... | B65D 23/001 |
| 2022/0167802 A1* | 6/2022 | Bing | ................... | A47K 5/1205 |
| 2023/0346171 A1* | 11/2023 | Runius | .................... | A47K 5/12 |

FOREIGN PATENT DOCUMENTS

| | | |
|---|---|---|
| CN | 207236711 U | 4/2018 |
| CN | 209489940 U | 10/2019 |
| CN | 209770195 U | 12/2019 |
| CN | 211811163 U | 10/2020 |
| CN | 212118000 U | 12/2020 |
| CN | 212755434 U | 3/2021 |
| CN | 213524938 U | 6/2021 |
| CN | 213640680 U | 7/2021 |
| CN | 214073071 U | 8/2021 |
| CN | 215227083 U | 12/2021 |
| CN | 215533883 U | 1/2022 |
| CN | 216454735 U | 5/2022 |
| CN | 216702408 U | 6/2022 |
| DE | 202021106955 U1 | 3/2022 |
| IT | 202000005962 A1 | 9/2021 |
| WO | 2022237985 A1 | 11/2022 |

\* cited by examiner

ADJUSTABLE HOLDER FOR A FLUID DISPENSING CONTAINER

CROSS-REFERENCE TO RELATED APPLICATIONS

The present application claims priority to U.S. Provisional Patent Application Ser. No. 63/350,477, filed Jun. 9, 2022, the entirety of which is incorporated herein by reference.

BACKGROUND OF THE INVENTION

Hotels and other lodging rental places often provide various amenities to consumers using their services. For example, hotels and lodging rental places may provide users with soap, shampoo, conditioner, lotion, toothpaste, and the like. In some instances, such amenities may be provided in a large container or bottle such that there is a desire to ensure that the consumer does not take the container with them when they leave the hotel or other lodging rental place. At the same time, such lodging places desire to maintain a particular aesthetic. Thus, a need exists for an amenity holder that is aesthetically pleasing and that prevents theft of the amenity held thereby.

BRIEF SUMMARY OF THE INVENTION

The present invention is directed to an adjustable holder that may be configured to support a fluid dispensing container. The adjustable holder may include a clamp portion and a locking assembly. The clamp portion may include a first part and a second part, with the second part being movable relative to the first part. The first and second parts may include first and second locking channels. The locking assembly may include a connection member that is located within the first and second locking channels and a locking member. The locking member may be alterable between a locked state and an unlocked state, such that the first part of the clamp is movable relative to the second part of the clamp portion when the locking member is in the unlocked state. The first part may be movable relative to the second part between an open state and a closed state.

In one aspect, the invention may be an adjustable holder configured to support a fluid dispensing container, the adjustable holder comprising: a clamp portion comprising: a first part comprising a front edge, a rear edge, at least one front recess in the front edge, and a first locking channel extending from the front edge towards the rear edge; and a second part comprising a front edge, a rear edge, at least one rear recess in the rear edge, and a second locking channel extending from the rear edge towards the front edge; a locking assembly comprising: a connection member comprising a first portion that is located within the first locking channel and a second portion that is located within the second locking channel; and a locking member accessible along a bottom surface of the clamp portion, the locking member being alterable between: (1) a locked state whereby the locking member prevents movement of the second part of the clamp portion relative to the first part of the clamp portion; and (2) an unlocked state whereby the second part of the clamp portion is permitted to move relative to the first part of the clamp portion between: (a) a closed state wherein the rear edge of the second part abuts the front edge of the first part and the at least one front and rear recesses are aligned to define a closed geometry aperture that extends from a top of the clamp portion to a bottom of the clamp portion; and (b) an open state wherein the rear edge of the second part is spaced from the front edge of the first part to facilitate replacement of the fluid dispensing container.

In another aspect, the invention may be an adjustable holder configured to support a fluid dispensing container, the adjustable holder comprising: a clamp portion comprising: a first part comprising a front edge, a rear edge, at least one front recess in the front edge, a first locking channel extending from the front edge towards the rear edge, and a first alignment channel extending from the front edge towards the rear edge, the first locking channel and the first alignment channel being open at the front edge; and a second part comprising a front edge, a rear edge, at least one rear recess in the rear edge, a second locking channel extending from the rear edge towards the front edge, and a second alignment channel extending from the rear edge towards the front edge, the second locking channel and the second alignment channel being open at the rear edge; an alignment member comprising a first portion positioned within the first alignment channel of the first part and a second portion positioned within the second alignment channel of the second part; a locking assembly comprising: a connection member comprising a first portion that is located within the first locking channel and a second portion that is located within the second locking channel; and a locking member that is alterable between: (1) a locked state whereby the locking assembly prevents the second part of the clamp portion from moving relative to the first part of the clamp portion and relative to the locking member; and (2) an unlocked state whereby the second part of the clamp portion is configured to move relative to the first part of the clamp portion and relative to the locking member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
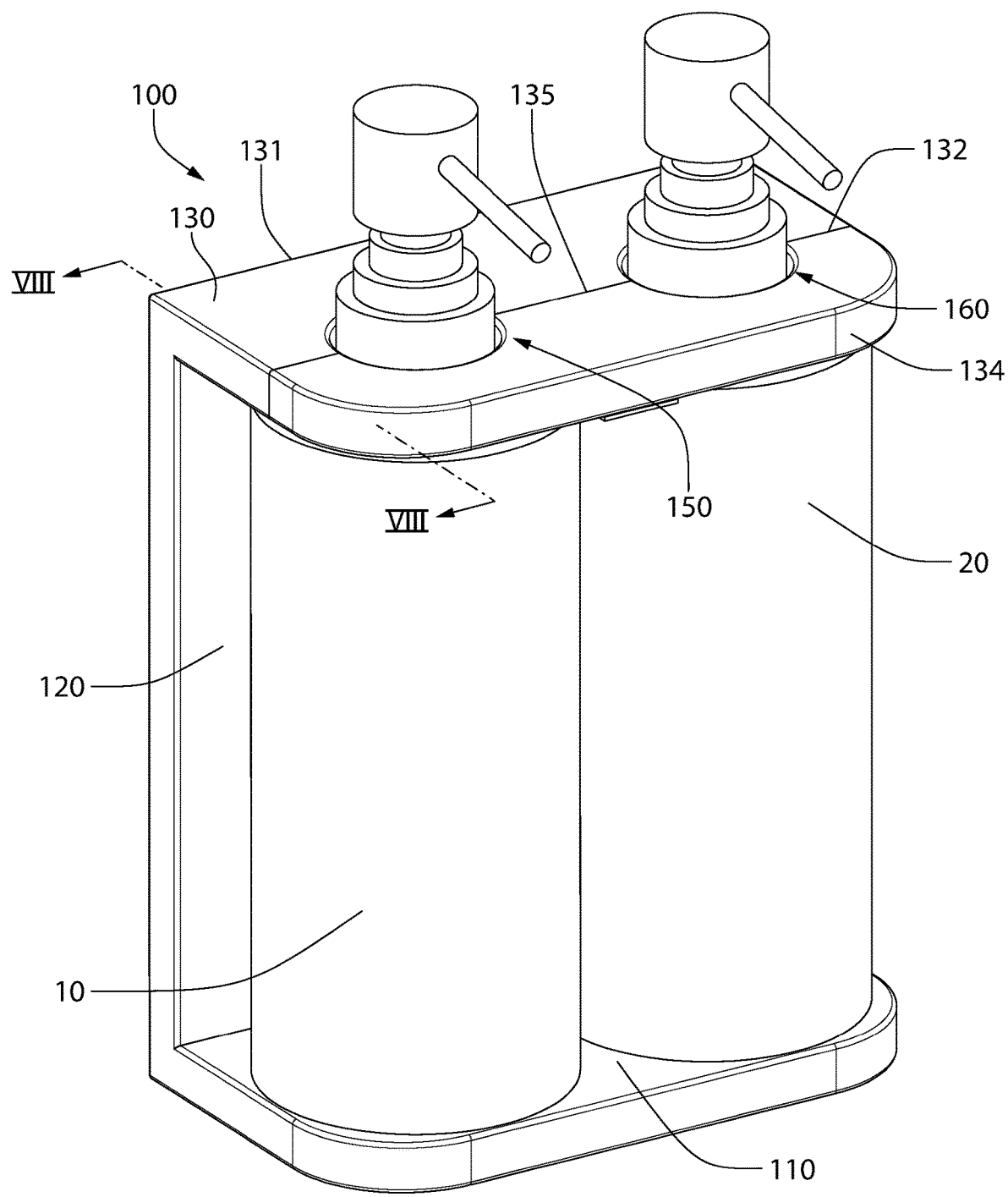
FIG. 1 is a top, front perspective view of an adjustable holder for a container in accordance with an embodiment of the present invention, wherein a clamp portion of the adjustable holder is in a closed state.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring first to FIG. 1, an adjustable holder 100 is illustrated in accordance with an embodiment of the present invention. The adjustable holder 100 may be configured to hold or otherwise support one or more fluid dispensing containers. In FIG. 1, the adjustable holder 100 is used to hold a bottle of shampoo 10 and a bottle of conditioner 20. However, the invention is not to be so limited and the adjustable holder 100 may be used to hold any of various different fluid dispensing containers (or amenities), including bottles of lotion, bottles of body soap, toothpaste tubes, containers of shaving cream, or the like. Certain features of the adjustable holder 100 may be modified or adjusted as needed to enable the adjustable holder 100 to adequately hold and lock different types of containers or bottles. The adjustable holder 100 may be configured to hold two fluid dispensing containers, or it may be configured to hold one fluid dispensing container, or three or more fluid dispensing containers.

The adjustable holder 100 may comprise a bottom portion 110, a back portion 120, and a clamp portion 130. The bottom portion 110 may be coupled to a bottom end of the back portion 120. The clamp portion 130 may be coupled to a top end of the back portion 120. Thus, the bottom and clamp portions 110, 130 may be spaced apart by a distance that is substantially equal to a length or height of the back portion 120. The bottom portion 110 may form a floor upon which a lower surface of the fluid dispensing containers (i.e., the bottles of shampoo and conditioner 10, 20) may rest when the bottles of shampoo and conditioner 10, 20 are supported by the adjustable holder 100. The back portion 120 may include features on its rear surface to facilitate the mounting of the adjustable holder 100 to a support structure or support surface, such as a wall, an outer surface of a cabinet, or the like. For example, the back portion 120 may include apertures or recesses for receiving a mounting bracket, screws, or other hardware that facilitate the mounting of the adjustable holder 100 to a desired support structure or support surface.

The clamp portion 130 may comprise a first part 131 and a second part 133. The first part 131 may be coupled directly to the top end of the back portion 120 and may extend perpendicularly from the back portion 120 to a distal end 132 that forms a front edge of the first part 131. The second part 133 may be movably coupled to the first part 131. The second part 133 may be coupled to the first part 131 so as to extend from the distal end 132 of the first part 131 to a distal end 134 of the second part 133. The distal end 134 of the second part 133 may form a distal end of the clamp portion 130. The distal end 134 of the second part 133 may form a front edge of the second part 133 whereas the opposite end of the second part 133 which faces the first part 131 may form a first edge of the second part 133.

In one embodiment, the bottom portion 110, the back portion 120, and the first part 131 of the clamp portion 130 may be integrally formed as a monolithic structure. In another embodiment, the bottom portion 110 and the first part 131 of the clamp portion 130 may be formed separately from the back portion 120, but may be coupled thereto using adhesives or the like. The bottom portion 110, the back portion 120, and the first part 131 of the clamp portion 130 may form a fixed structure when assembled such that the bottom portion 110, the back portion 120, and the first part 131 of the clamp portion 130 are non-movable relative to one another. The second part 133 of the clamp portion 130 may be coupled to the first part 131 of the clamp portion 130 with various connectors (i.e., plates, rods, etc.), as described further below.

Figure 2:
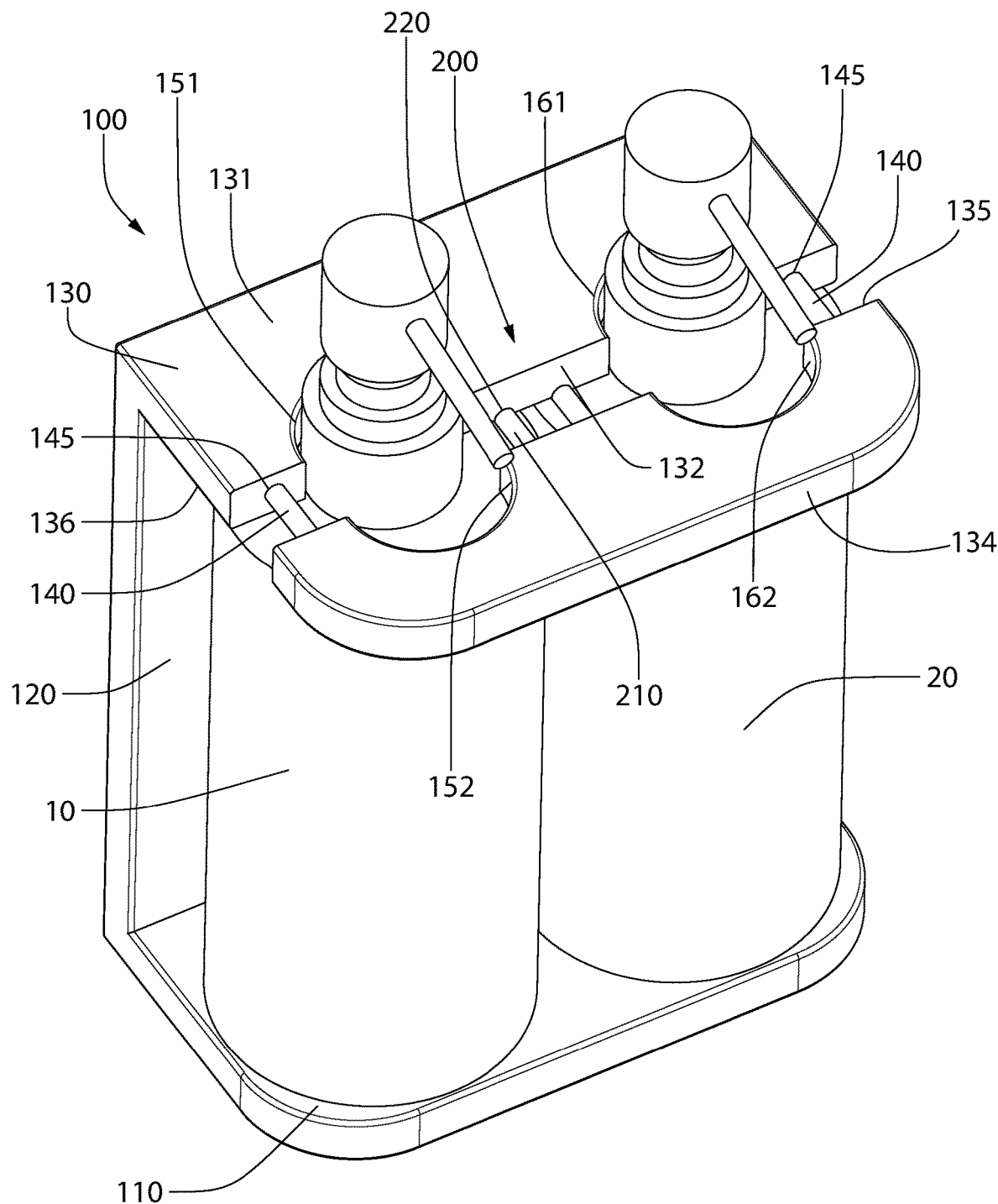
FIG. 2 is a top, front perspective view of the adjustable holder of FIG. 1 with the clamp portion in an open state.

Referring to FIGS. 1 and 2 concurrently, the first and second portions 131, 133 of the clamp portion 130 are coupled together, but they are not fixed in position relative to one another. Rather, the second part 133 of the clamp portion 130 is configured to move relative to the first part 131 of the clamp portion 130 between a closed state (FIG. 1) and an open state (FIG. 2). The first part 131 of the clamp portion 130 may be fixedly coupled to the back portion 120 of the adjustable holder 100 and thus the first part 131 of the clamp portion 130 may be non-movable, particularly when the adjustable holder 100 is mounted on a wall or other mounting surface.

FIG. 1 illustrates the clamp portion 130 in a closed state and FIG. 2 illustrates the clamp portion 130 in an open state. In the closed state, a rear edge 135 of the second part 133 of the clamp portion 130 may be adjacent, and perhaps in abutting contact with, the distal end (i.e., the front edge) 132 of the first part 131 of the clamp portion 130. In the open state, the rear edge 135 of the second part 133 of the clamp portion 130 is spaced apart from the distal end (i.e., the front edge) 132 of the first part 131 of the clamp portion 130. Thus, the second part 133 of the clamp portion 130 moves away from the distal end 132 of the first part 131 of the clamp portion 130 when altering the clamp portion 130 from the closed state (FIG. 1) to the open state (FIG. 2). As will be discussed below, when in the closed state, the second part 133 of the clamp portion 130 may be locked to the first part 131 of the clamp portion 130 so that the second part 133 of the clamp portion 130 is prevented from being altered from the closed state to the open state. There may be a locking mechanism or locking assembly which can be altered from a locked state to an unlocked state such that when in the unlocked state the second part 133 of the clamp portion 130 is capable of moving relative to the first part 131 of the clamp portion 130.

Referring to FIG. 2, as described in greater detail below, the adjustable holder 100 may comprise a pair of alignment members 140. The alignment members 140 may be rod-shaped. The alignment members 140 may have a round or circular transverse cross-sectional shape, although the invention is not to be so limited in all embodiments and the alignment members 140 may have other transverse cross-sectional shapes, such as square, rectangular, triangular, or the like in other embodiments. The alignment members 140 may be positioned within channels 145 formed into the first part 131 of the clamp portion 130. The alignment members 140 may be fixedly coupled to the first part 131 of the clamp portion 130 using various techniques, including fasteners, adhesives, or the like. The alignment members 140 may also nest within channels (not visible in FIG. 2) formed into the second part 133 of the clamp portion 130. The alignment members 140 may be non-fixed to the second part 133 of the clamp portion 130. As such, the alignment members 140 may slide within the channels of the second part 133 of the clamp portion 130 as the second part 133 of the clamp portion 130 is altered between the closed and open states. That is, the second part 133 of the clamp portion 130 may move relative to the alignment members 140 (which are fixed in position) when the second part 133 of the clamp portion 130 moves between the open and closed states.

The adjustable holder 100 may also comprise a locking assembly 200 which is only partially visible in FIG. 2. The locking assembly 200 may comprise one or more connection members (which may be referred to herein as locking rails) 210 that are disposed within grooves 220 formed into a bottom surface 136 of the first part 131 of the clamp portion 130 and within grooves 221 formed into a bottom surface 138 of the second part 133 of the clamp portion 130 (see FIGS. 6 and 7). These features will be described in more detail below with reference to FIGS. 6-13.

Referring again to FIGS. 1 and 2, the first and second parts 131, 133 of the clamp portion 130 may collectively define a first opening 150 and a second opening 160 when the clamp portion 130 is in the closed state. The first and second openings 150, 160 may be closed geometry apertures that extend from a top of the clamp portion 130 to a bottom of the clamp portion 130. The first and second openings 150, 160 are circular in the exemplified embodiment, but they may take on other shapes in other embodiments including square, rectangular, triangular, other polygonal shapes, irregular shapes, or the like.

The first part 131 of the clamp portion 130 may comprise a first front recess 151 and a second front recess 161 in the front edge 132. The first and second front recesses 151, 161 may be semicircular shaped, although other shapes may be used depending on the final shape of the first and second openings 150, 160 as mentioned above. The second part 131 of the clamp portion 130 may comprise a first rear recess 152 and a second rear recess 162 formed into the rear edge 135 of the second part 131. The first and second rear recesses 152, 162 may be semicircular, although other shapes may be used depending on the final shape of the first and second openings 150, 160 as mentioned above. In other embodiments, there may be just one of the front recesses and one of the rear recesses, or there could be three or more of each of the front and rear recesses. In an embodiment, there may be a corresponding or same number of front and rear recesses.

The first and second front recesses 151, 161 and the first and second rear recesses 152, 162 may be U-shaped notches with an arcuate curvature, or they may have a squared shape or take on any other shape desired. The first rear recess 152 may be positioned in alignment with the first front recess 151 and the second rear recess 162 may be positioned in alignment with the second front recess 152. Thus, when the clamp portion 130 is in the closed state such that the rear edge 135 of the second part 133 of the clamp portion 130 is adjacent to or in abutment with the distal end or front edge 132 of the first part 131 of the clamp portion 130, the first front and rear recesses 151, 152 form the first opening 150 and the second front and rear recesses 161, 162 form the second opening 160. Due to the U-shaped and arcuate nature of the various recesses 151, 152, 161, 162, in the exemplified embodiment the first and second openings 150, 160 are circular in shape. However, the invention is not to be so limited in all embodiments and the first and second openings 150, 160 may have square, rectangular, triangular, or various other regular or irregular polygonal shapes.

When the containers 10, 20 are positioned on the bottom portion 110 of the adjustable holder 100 and the clamp portion 130 is in the closed state, a portion of the bottles 10, 20 may protrude through the openings 150, 160 in the clamp portion 130. In the exemplified embodiment, the containers 10, 20 may include a pump portion located above the top surface of the clamp portion 130 with a main body of the containers 10, 20 being located below the bottom surface of the clamp portion 130 and aligned with the back portion 120. Once so positioned, the containers 10, 20 may not be able to be readily removed from the adjustable holder 100 without either: (1) unscrewing a cap of the container from the body of the container; or (2) altering the clamp portion 130 from the closed state of FIG. 1 to the open state of FIG. 2.

FIGS. 1 and 2 illustrate the adjustable holder 100 which is configured to hold two containers, which in the exemplified embodiment include the bottle of shampoo 10 and the bottle of conditioner 20, although different amenities may be contained in the bottles as described herein. However, different styles of adjustable holders may utilize the inventive concepts disclosed herein.

Figure 3:
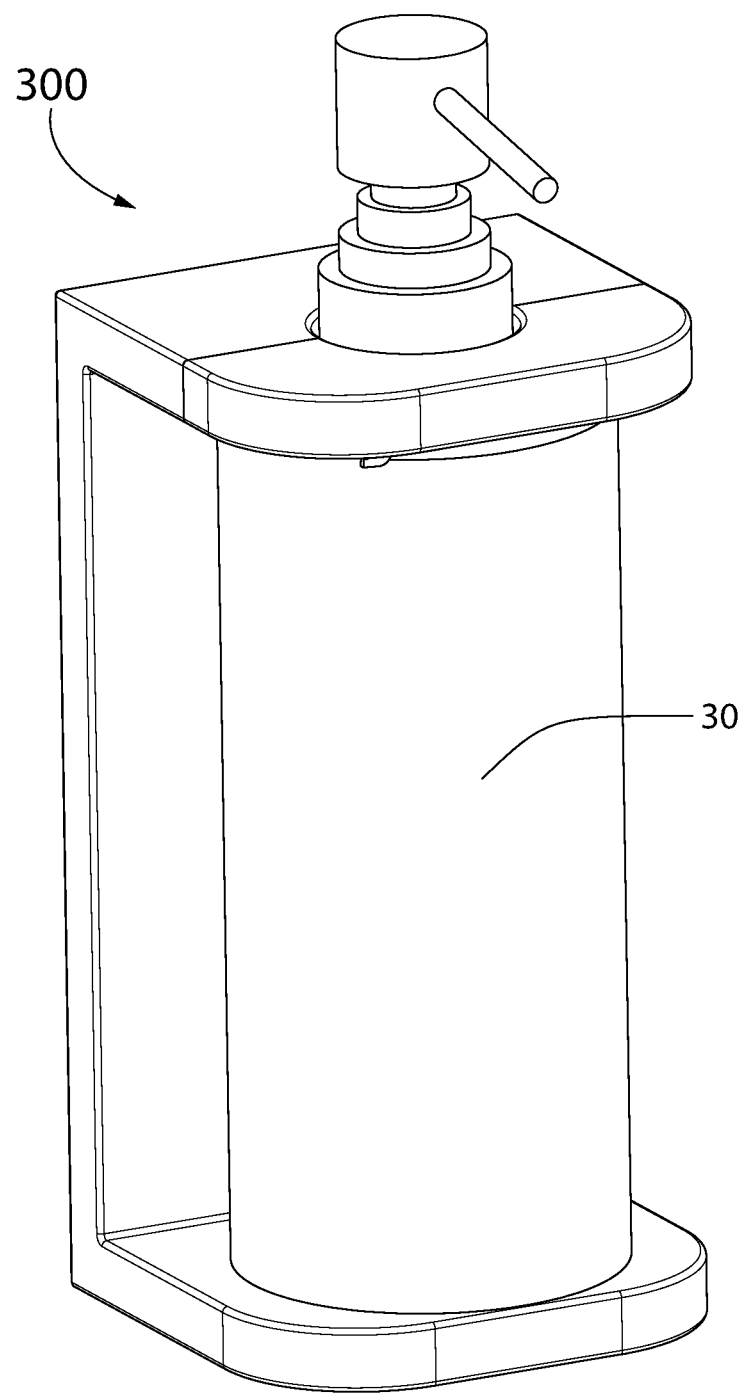
FIG. 3 is a top, front perspective view of an adjustable holder in accordance with another embodiment of the present invention.

For example, referring to FIG. 3 an adjustable holder 300 is illustrated. The adjustable holder 300 utilizes the same features, components, and the like as the adjustable holder 100, except the adjustable holder 300 is only configured to hold a single bottle 30. Thus, the disclosure set forth herein with reference to the adjustable holder 100 is applicable to the adjustable holder 300.

Figure 4:
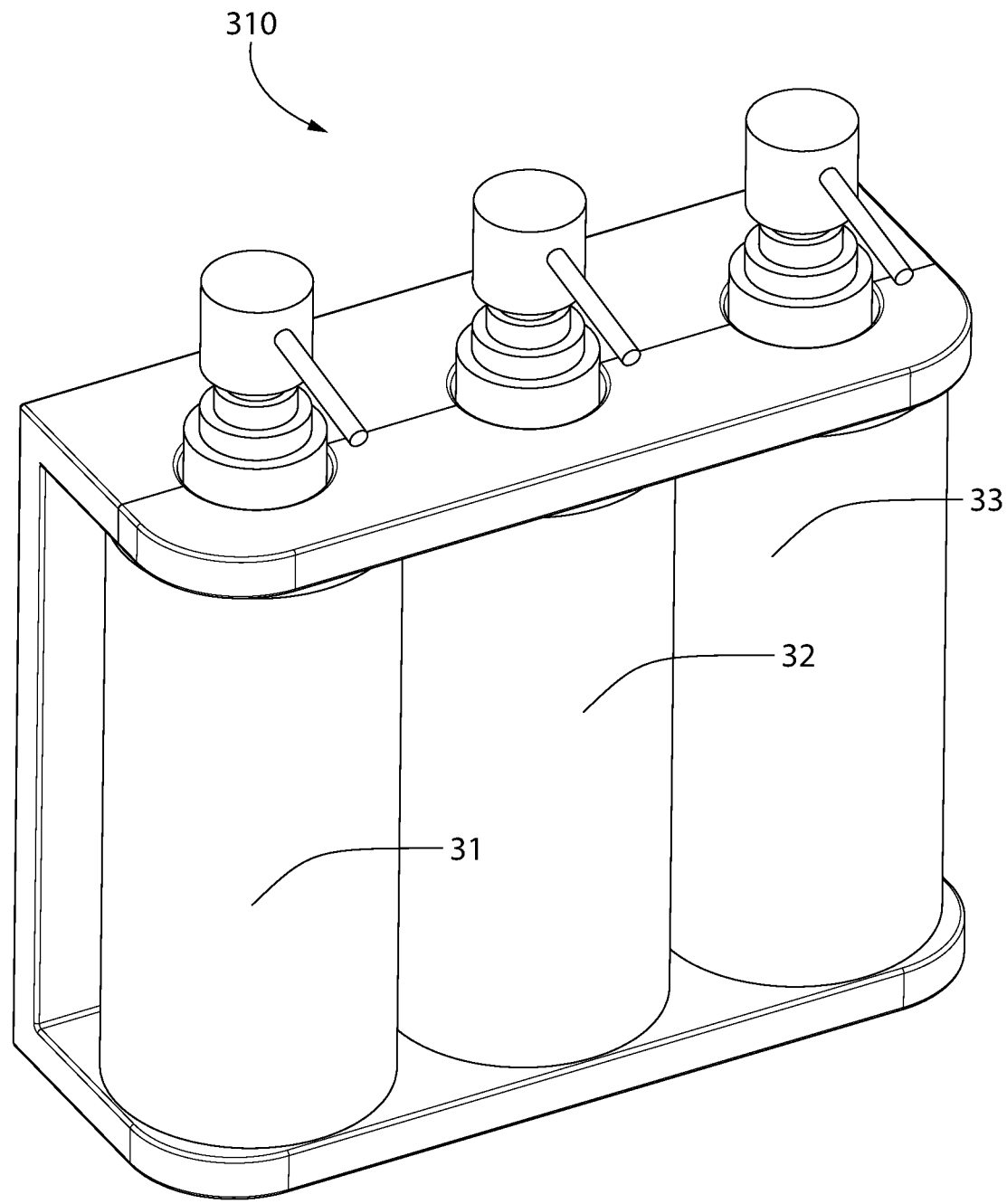
FIG. 4 is a top, front perspective view of an adjustable holder in accordance with another embodiment of the present invention.

Referring to FIG. 4, an adjustable holder 310 is illustrated. The adjustable holder 310 utilizes the same features, components, and the like as the adjustable holder 100, except the adjustable holder 300 is configured to hold three bottles 31, 32, 33. Thus, the disclosure set forth herein with reference to the adjustable holder 100 is applicable to the adjustable holder 300.

Figure 5:
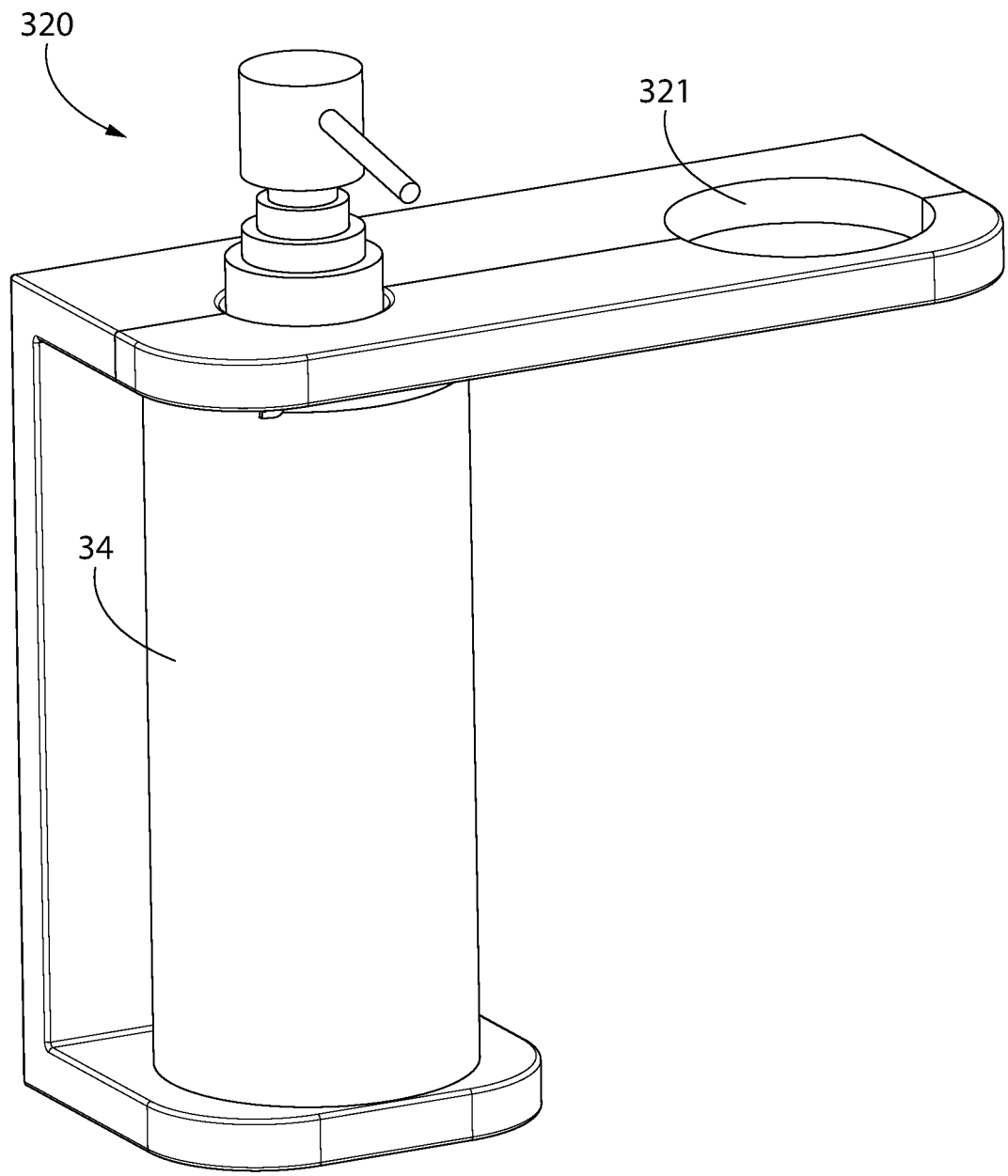
FIG. 5 is a top, front perspective view of an adjustable holder in accordance with still another embodiment of the present invention.

Referring to FIG. 5, an adjustable holder 320 is illustrated. The adjustable holder 320 utilizes the same features, components, and the like as the adjustable holder 100, except the adjustable holder 320 is configured to hold one bottle 34 while also having a hole 321 which is configured to receive and hold a hair dryer or the like. Thus, the disclosure set forth herein with reference to the adjustable holder 100 is applicable to the adjustable holder 320.

The adjustable holder 100, and more specifically the bottom portion 110, back portion 120, and clamp portion 130 thereof may be formed from any of a variety of different materials, including plastic, wood, marble, solid surface, quartz, ceramic, granite, soapstone, other stone materials, stainless steel, or the like. In one embodiment, the adjustable holder 100 may be formed from a brittle material selected from the group consisting of solid surface, marble, quartz, and granite. In one embodiment, the adjustable holder 100 may be formed from solid surface material. In another preferred, the adjustable holder 100 may be formed from marble, such as cast marble. In some embodiments, the adjustable holder 100, and more specifically, the bottom portion 110, back portion 120, and/or clamp portion 130 thereof, may be made from machinable materials that are impervious to water and staining. In one embodiment, the bottom portion 110, the back portion 120, and the clamp portion 130 of the adjustable holder 100 may not be formed from metal.

Figure 6:
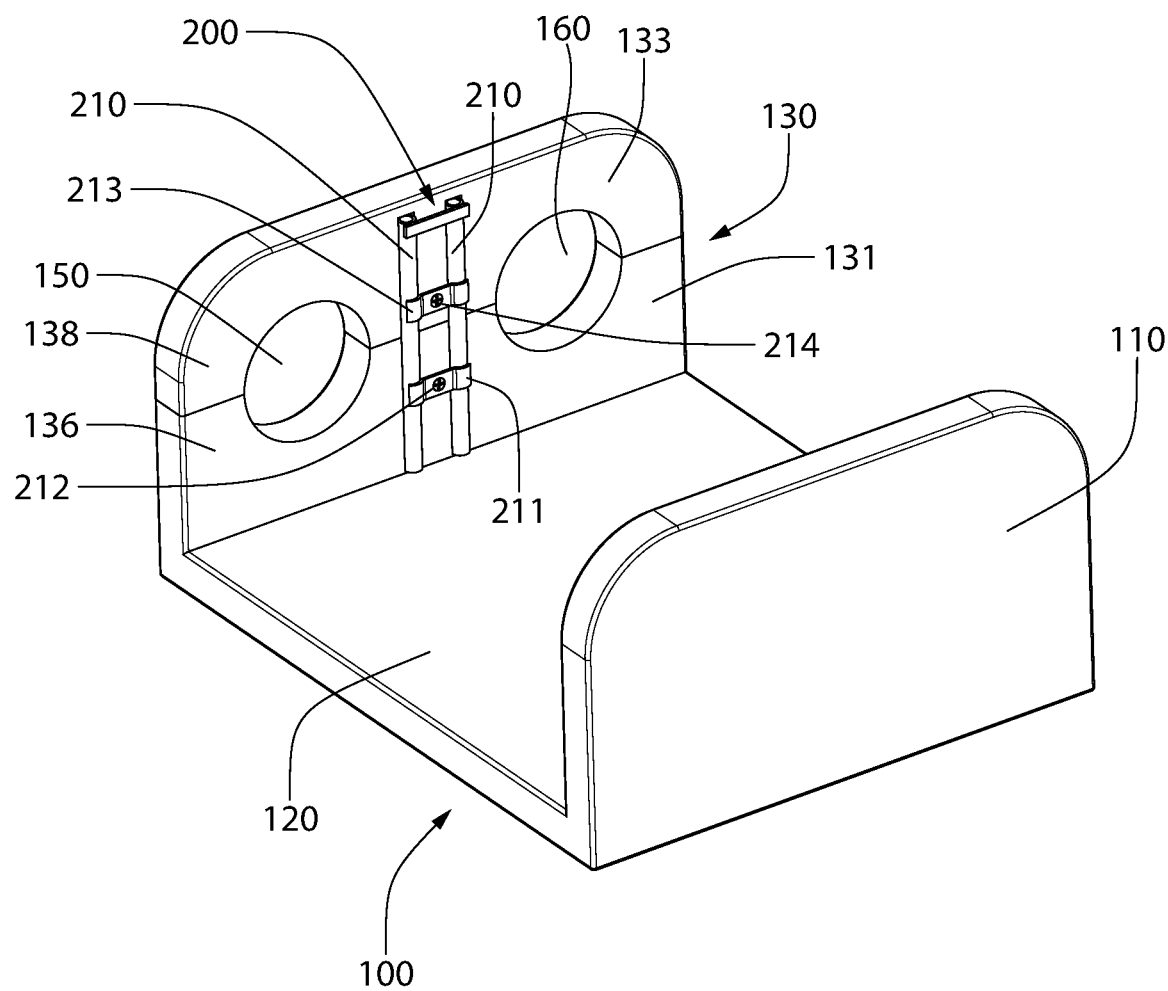
FIG. 6 is a bottom, front perspective view of the adjustable holder of FIG. 1 illustrating a locking assembly thereof which is used to lock the clamp portion in the closed state.
Figure 7:
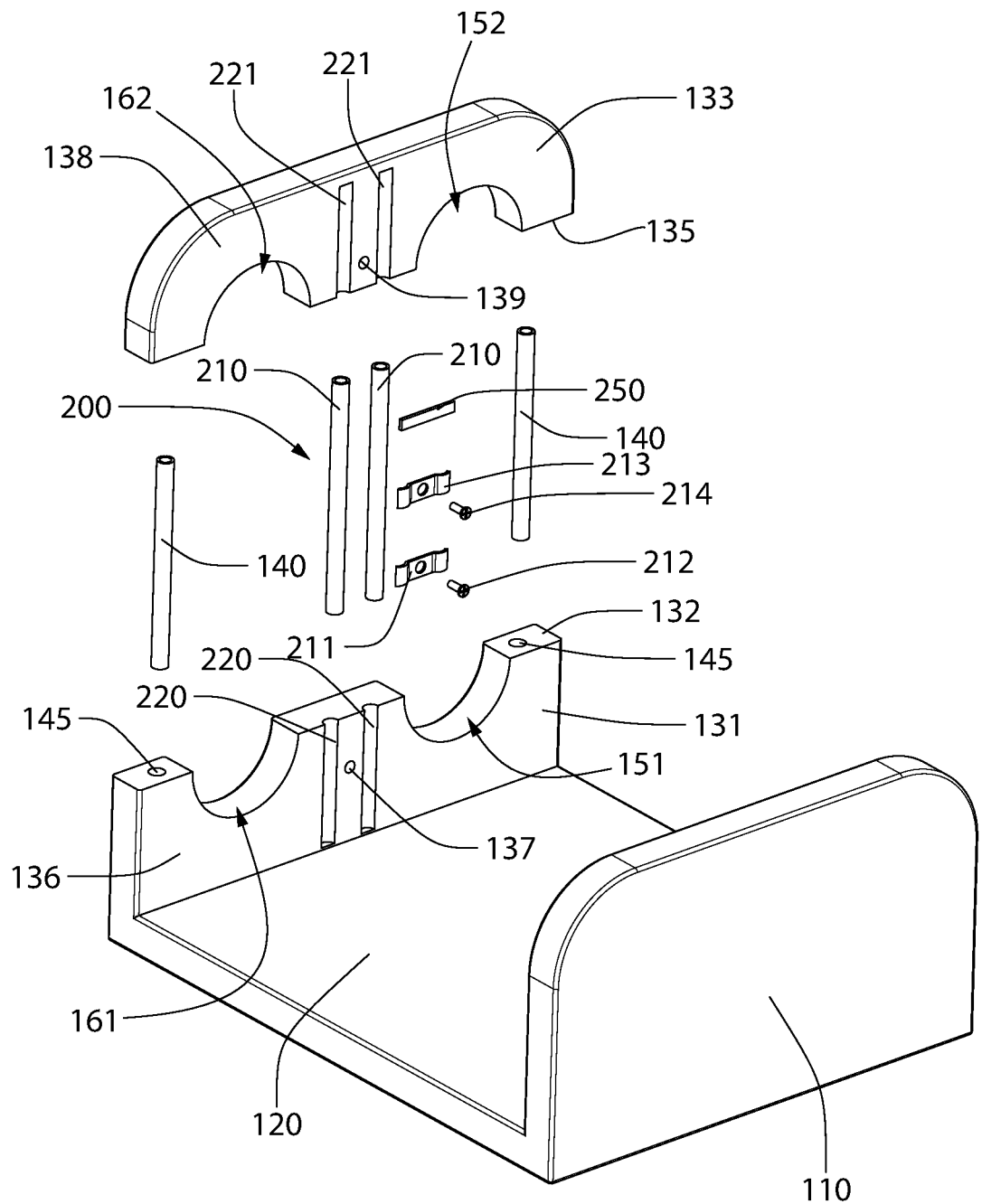
FIG. 7 is an exploded bottom, front perspective view of the adjustable holder of FIG. 1.
Figure 8:
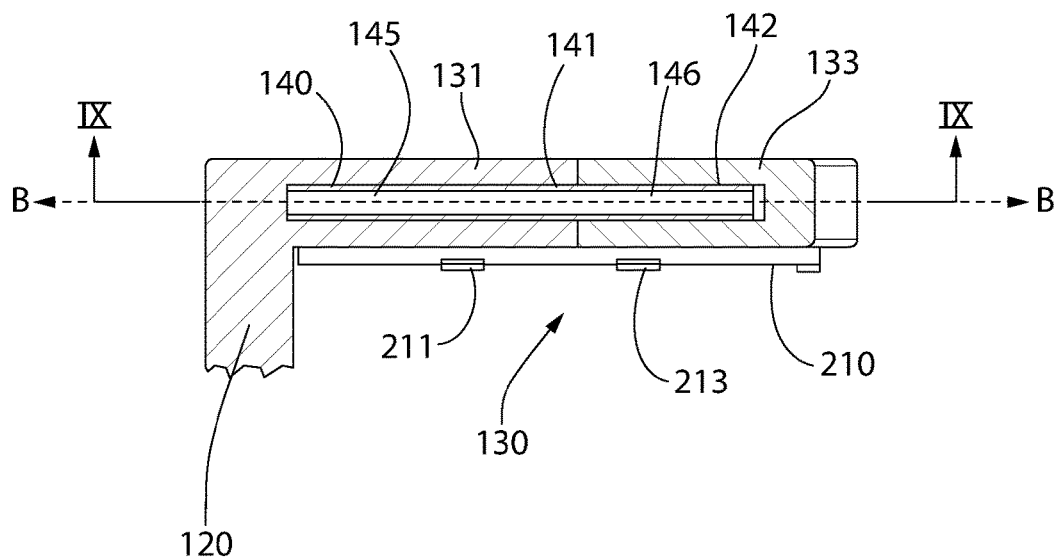
FIG. 8 is a cross-sectional view taken along line VIII-VIII of FIG. 1.
Figure 9:
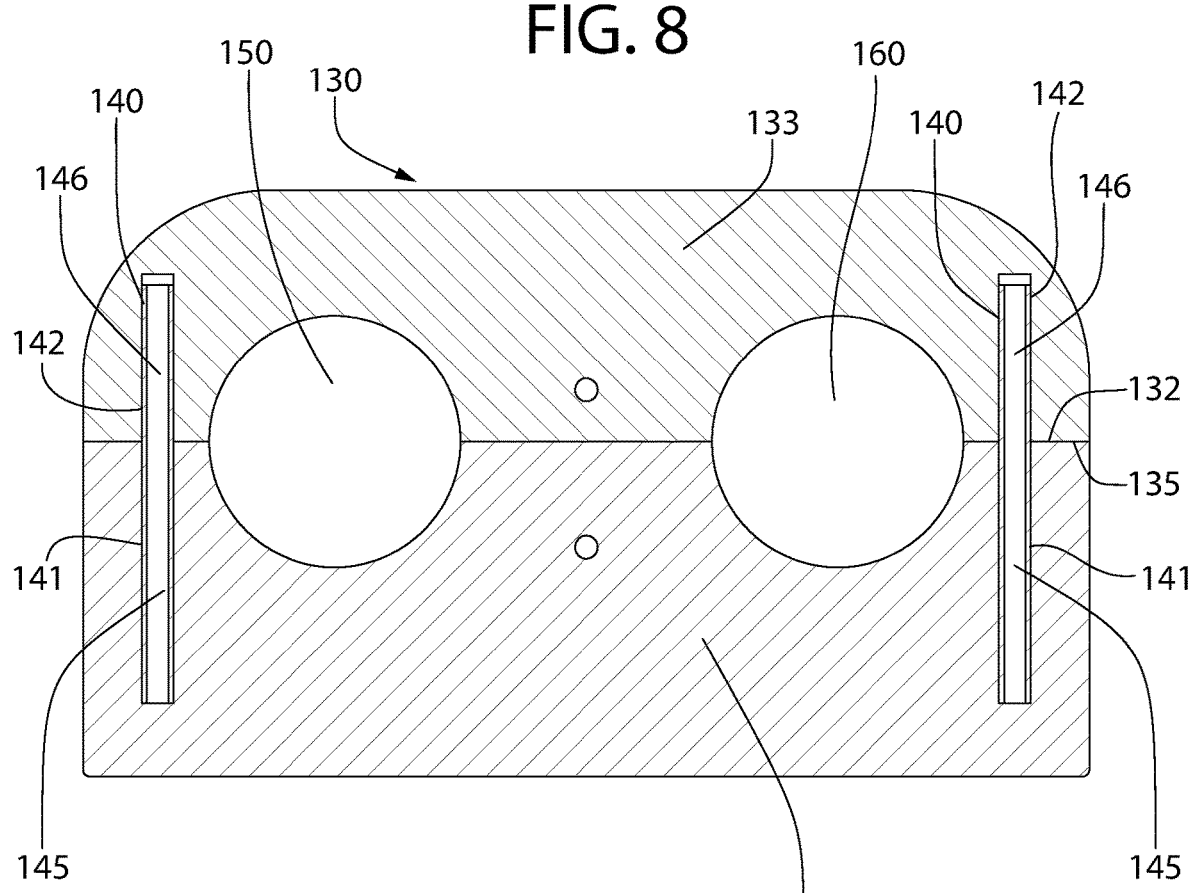
FIG. 9 is a cross-sectional view taken along line IX-IX of FIG. 8.

Referring to FIGS. 6 and 7 concurrently, the adjustable holder 100 will be further described. FIG. 6 provides an underside/bottom view of the clamp portion 130 of the adjustable holder 100 whereas FIG. 7 is the same view with the components exploded. As noted above, the adjustable holder 100 comprises the locking assembly 200. In the exemplified embodiment, the locking assembly 200 includes two of the connection members 210, although a single connection member or more than two connection members 210 could be used in other embodiments. In the exemplified embodiment, the connection members 210 are rails, tubes, cylindrical members, plates, or the like, which nest within the grooves 220, 221 formed into the bottom surfaces 136, 138 of the first and second parts 131, 133 of the clamp portion 130, respectively. The connection members 210 are more specifically illustrated as cylindrical shaped bodies or tubes, although the invention is not limited to the shape of the connection members 210 in all embodiments, which could be one or more flat plates or the like in other embodiments. The locking members 210 nest within the grooves 220, 221, such that a first portion of the locking members 210 nests within the grooves 220 in the first part 131 of the clamp portion 130 and a second portion of the locking members 210 nests within the grooves 220 in the second part 133 of the clamp portion 130.

The locking assembly 200 may further comprise a first locking member that comprises a first bracket 211 and a first fastener 212 and a second locking member that comprises a second bracket 213 and a second fastener 214. The first bracket 211 may be positioned over each of the two connection members 210 and then secured to the bottom surface 136 of the first part 131 of the clamp portion 130 with the first fastener 212. Specifically, the first bracket 211 may comprise a central portion having a hole for receiving the first fastener 212 and first and second arcuate arm portions extending from opposing sides of the central portion. The first and second arcuate arm portions may be configured to wrap around outer surfaces of the locking members 210 so that when the first bracket 211 is tightened to the first part 131, the connection members 210 are fixed to the first part 131. The first part 131 of the clamp portion 130 may comprise a first hole 137 for receiving the first fastener 212 to secure the first bracket 211 to the clamp portion 130.

The second bracket 213 may be positioned over each of the two locking rails 210 and then secured to the bottom surface 138 of the second part 133 of the clamp portion 130. Specifically, the second bracket 213 may comprise a central portion having a hole for receiving the second fastener 214 and first and second arcuate arm portions extending from opposing sides of the central portion. The first and second arcuate arm portions may be configured to wrap around outer surfaces of the locking members 210 so that when the second bracket 213 is tightened to the second part 133, the connection members 210 are fixed to the second part 133. The second part 133 of the clamp portion 130 may comprise a second hole 139 for receiving the second fastener 214 to secure the second bracket 213 to the clamp portion 130. The first and second fasteners 212, 214 may be screws or other articles of hardware designed for the stated purpose. The locking assembly 200 of the adjustable holder 100 may also comprise a stopper element 250. The stopper element 250 may be fixedly secured (welded, adhered, bonded, or the like) to the connection members 210 to prevent the second part 133 of the clamp portion 130 from being moved away from the first part 131 of the clamp portion 130 a distance which would cause the first and second connection members 210 to be completely removed from the grooves 221.

Referring to FIGS. 6-9, when the adjustable holder 100 is assembled, the channels 145 in the first part 131 of the clamp portion 130 are aligned with the channels 146 in the second part 133 of the clamp portion 130. Furthermore, the alignment members 140 nest within the channels 145 in the first part 131 of the clamp portion 130 and within channels 146 in the second part 133 of the clamp portion 130. Specifically, the alignment members 140 comprise a first axial portion 141 that nests within the channels 145 in the first part 131 and a second axial portion 142 that nests within eh channels 146 in the second part 133. The channels 145, 146 may be fully enclosed channels such that the channels 145 are open only at the front edge 132 of the first part 131 and the channels 146 are open only at the rear edge 135 of the second part 133.

The alignment members 140 may be fixed to one of the first and second portions 131, 133 of the clamp portion 130 while being slidable relative to the other one of the first and second portions 131, 133 of the clamp portion 130. For example, if the alignment members 140 are fixed to the first part 131 of the clamp portion 130, the second part 133 of the clamp portion 130 is not fixed to the alignment members 140 so that the second part 133 of the clamp portion 130 moves relative to the alignment members 140 when being altered between the closed and open states. If the alignment members 140 are fixed to the second part 133 of the clamp portion 130 but not to the first part 131 of the clamp portion 130, the second part 133 of the clamp portion 130 and the alignment members 140 may move relative to the first part 131 of the clamp portion 130 when being altered between the closed and open states. In one embodiment, the alignment members 140 may be fixed to the first part 131 of the clamp portion 130 but not to the second part 133 of the clamp portion 130. The alignment members 140 may be fixed to the first part 131 of the clamp portion 130 via adhesives, bonding, or the like. In another embodiment, the alignment members 140 may not be fixed to either of the first and second parts 131, 133, but may instead be held loosely within the channels 145, 146. In such an embodiment, the second part 133 may still be configured to move relative to the first part 131 and relative to the alignment members 140. The alignment members 140 may prevent the second part 133 from being moved upwardly/downwardly relative to the first part 131, instead only allowing for the second part 133 to move inwardly/outwardly relative to the first part 131 in a direction parallel to a longitudinal axis B-B of the alignment members 140. The second part 133 may not be capable of pivoting relative to the first part 131, but may instead only be capable of moving inwardly/outwardly relative to the first part 131 in the direction parallel to the longitudinal axis B-B.

When the adjustable holder 100 is assembled, the connection members 210 nest within the grooves 220 in the bottom surface 136 of the first part 131 of the clamp portion 130 and within the grooves 221 in the bottom surface 138 of the second part 133 of the clamp portion 130. The fasteners 212, 214 and the brackets 211, 213 secure the connection members 210 to the first and second portions 131, 133 of the clamp portion 130. One of the fasteners 212, 214 may be loosened in order to facilitate the movement of the second part 133 of the clamp portion 130 relative to the first part 131 of the clamp portion 130. For example, the second fastener 214 may be loosened to permit the second part 133 of the clamp portion 130 to move/slide relative to the first part 131 of the clamp portion 130 and also relative to the connection members 210 which remain fixed/secured/coupled to the first part 131 of the clamp portion 130 via the bracket 211 and the fastener 212. Alternatively, the first fastener 212 may be loosened to permit the second part 133 of the clamp portion 130 to move/slide relative to the first part 131 of the clamp portion 130. If the first fastener 212 is loosened and the second fastener 214 remains tightened, the connection members 210 may move/slide relative to the first part 131 of the clamp portion 130 along with the second part 133 of the clamp portion 130.

Figure 10:
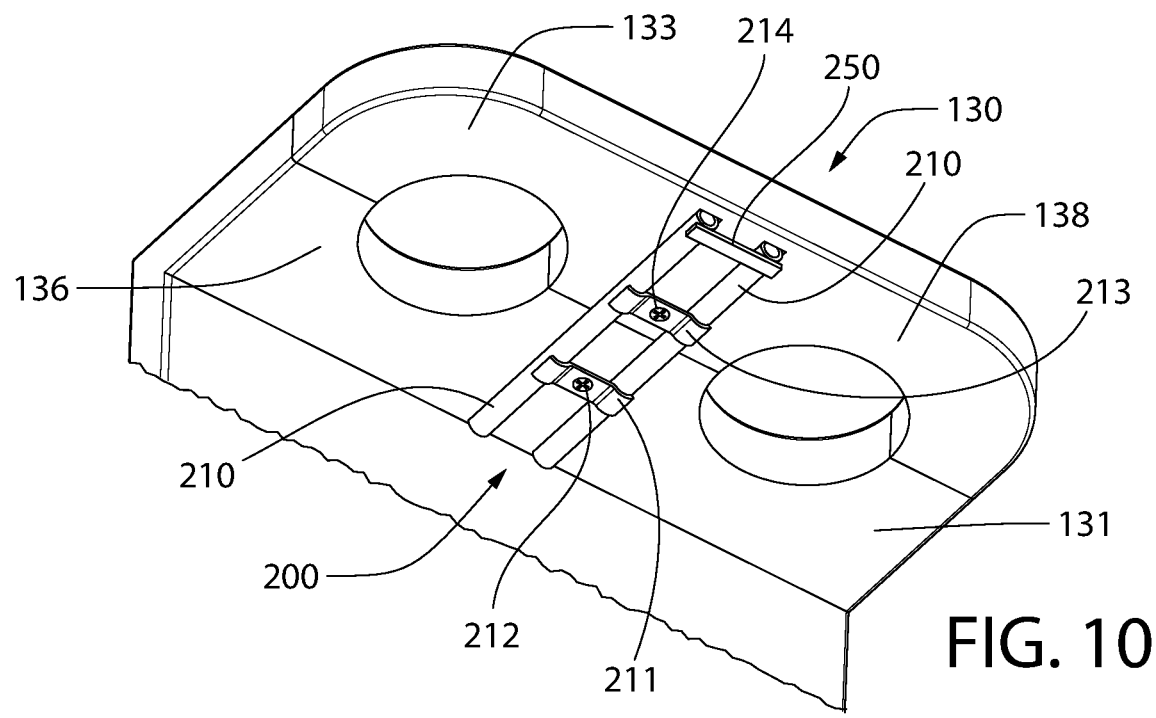
FIG. 10 is a cut-away bottom perspective view of the clamp portion of the adjustable holder of FIG. 1 in the closed state with the locking assembly thereof in a locked state.

FIG. 10 once again illustrates the bottom surfaces 136, 138 of the first and second portions 131, 133 of the clamp portion 130 to illustrate the locking assembly 200. In FIG. 10, the clamp portion 130 is in the closed state and the locking assembly 200 is in the locked state. That is, both of the fasteners 212, 214 are fully screwed into the brackets 211, 213 and the first and second portions 131, 133 of the clamp portion 130. The brackets 211, 213 are therefore clamped to the connection members 210. As such, the brackets 211, 213 and the fasteners 212, 214 prevent the second part 133 of the clamp portion 130 from moving relative to the first part 131 of the clamp portion 130. The second part 133 of the clamp portion 130 may be able to move relative to the first part 131 of the clamp portion 130 only after loosening one or both of the fasteners 212, 214.

Figure 11:
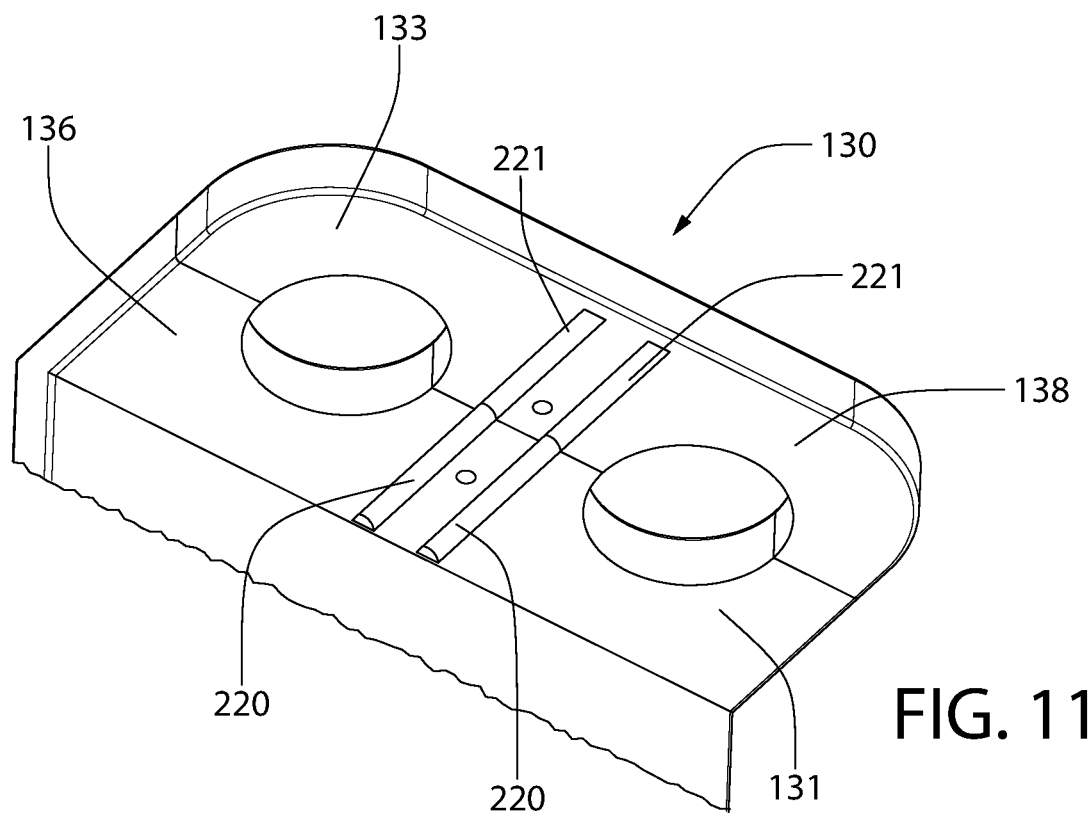
FIG. 11 is the cut-away bottom perspective view of the clamp portion of the adjustable holder of FIG. 10 with the locking assembly omitted.

FIG. 11 illustrates the bottom surfaces 136, 138 of the first and second portions 131, 133 of the clamp portion 130 with the locking assembly 200 removed/omitted. Thus, the grooves 220, 221 in the bottom surfaces 136, 138 of the first and second portions 131, 133 of the clamp portion 130 are visible. When the locking assembly 200 is in place, the connection members 210 nest within the grooves 220, 221. Furthermore, as the second part 133 of the clamp portion 130 moves/slides relative to the first part 131 of the clamp portion 130 to alter the clamp portion 130 between the open and closed states, the connection members 210 may slide within the grooves 220 in the first part 131 of the clamp portion 130 or the grooves 221 in the second part 133 of the clamp portion 130, or both.

Figure 12:
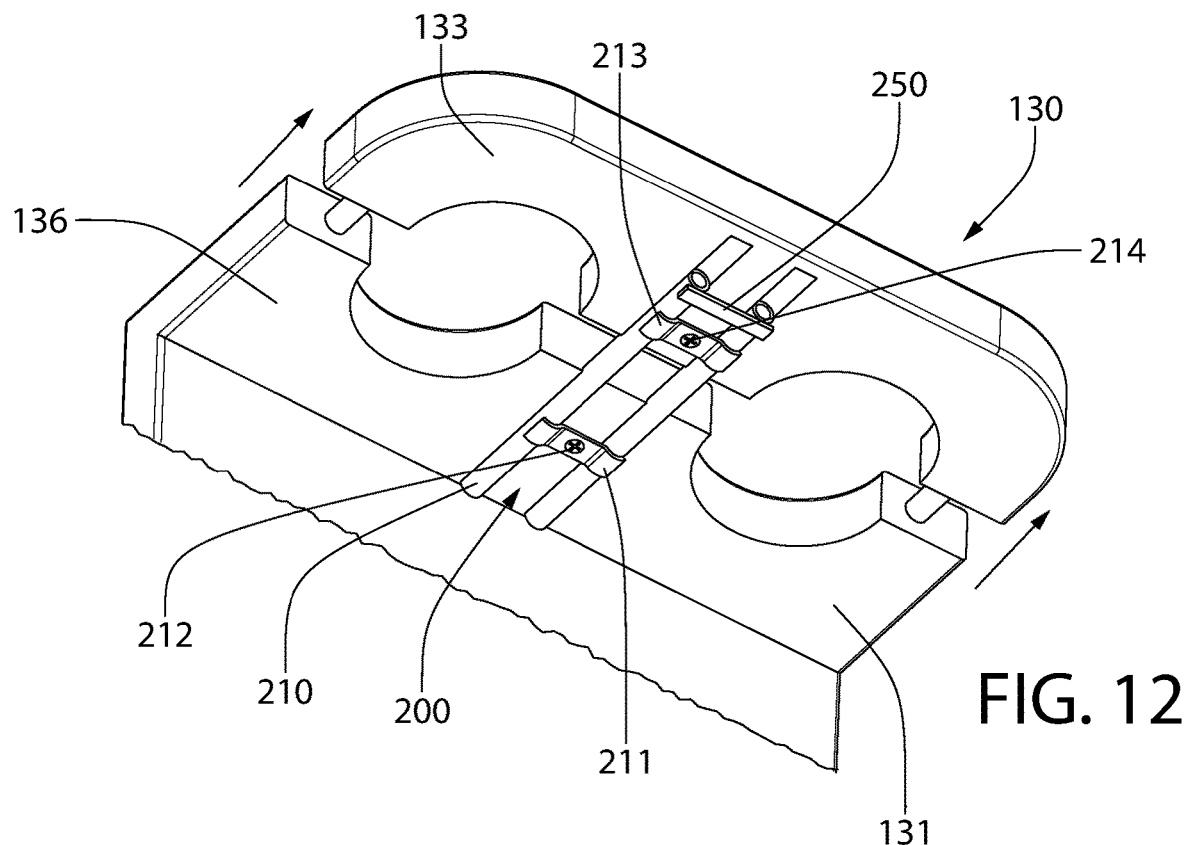
FIG. 12 is the cut-away bottom perspective view of the clamp portion of the adjustable holder of FIG. 10 in an intermediate state between the closed and open states with the locking assembly having been altered from the locked state to an unlocked state.
Figure 13:
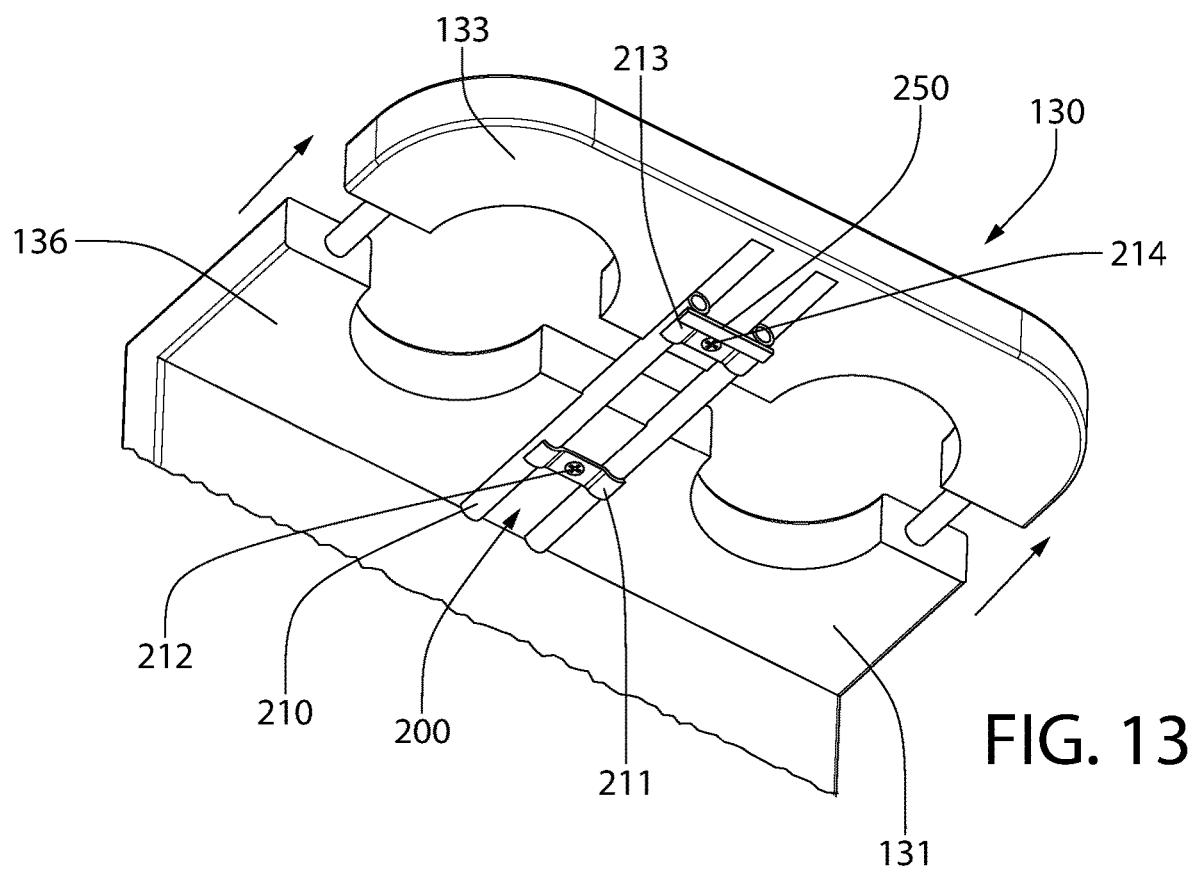
FIG. 13 is the cut-away bottom perspective view of the clamp portion of the adjustable holder of FIG. 10 in the open state.

Referring to FIGS. 12 and 13, the altering of the locking member(s) of the locking assembly 200 into the unlocked state and then the movement of the second part 133 of the clamp portion 130 relative to the first part 131 of the clamp portion 130 will be described. As discussed above, to alter the locking assembly 200 into the unlocked state, in the exemplified embodiment the second fastener 214 may be loosened (or unscrewed). In other embodiments, the locking assembly 200 may be altered into the unlocked state by loosening or unscrewing the first fastener 212. If the second fastener 214 is loosened, the connection members 210 are clamped to the first part 131 of the clamp portion 130 via the first bracket 211 and the first fastener 212. Once the second fastener 214 has been loosened or unscrewed, the second part 133 of the clamp portion 130 is capable of moving/sliding relative to the first part 131 of the clamp portion 130. The second part 133 of the clamp portion 133 also moves relative to the connection members 210 which are fixed to the first part 1331 of the clamp portion 133 by the first bracket 211 and the first fastener 212, as described above. FIGS. 12 and 13 illustrate the second part 133 of the clamp portion 130 being moved away from the first part 131 of the clamp portion 130. The arrows indicate the direction of movement of the second part 133 of the clamp portion 130 relative to the first part 131 of the clamp portion 130.

The stopper element 250 may be fixed to the distal ends of the connection members 210. The stopper element 250 may be fixed to the connection members 210 by adhesive, welding, bonding, or the like. Alternatively, the stopper element 250 could be integrally formed with the connection members 210. When the clamp portion 130 is in the fully open state as shown in FIG. 13, the stopper element 250 may abut or contact the second bracket 213 to prevent further movement of the second part 133 of the clamp portion 130 relative to the first part 131 of the clamp portion 130. Specifically, the second bracket 213 remains coupled to the second part 133 by the second fastener 214. As the second part 133 moves relative to the first part 131 and relative to the connection members 210, the second bracket 213 moves along with the second part 133 until the second bracket 213 contacts the stopper element 250. Thus, the stopper element 250 may prevent the second part 133 of the clamp portion 130 from becoming completely detached from the connection members 210 and the alignment members 140. As the second part 133 of the clamp portion 130 is slid further from the first part 131 of the clamp portion 130, the alignment members 140 may become exposed.

Figure 14:
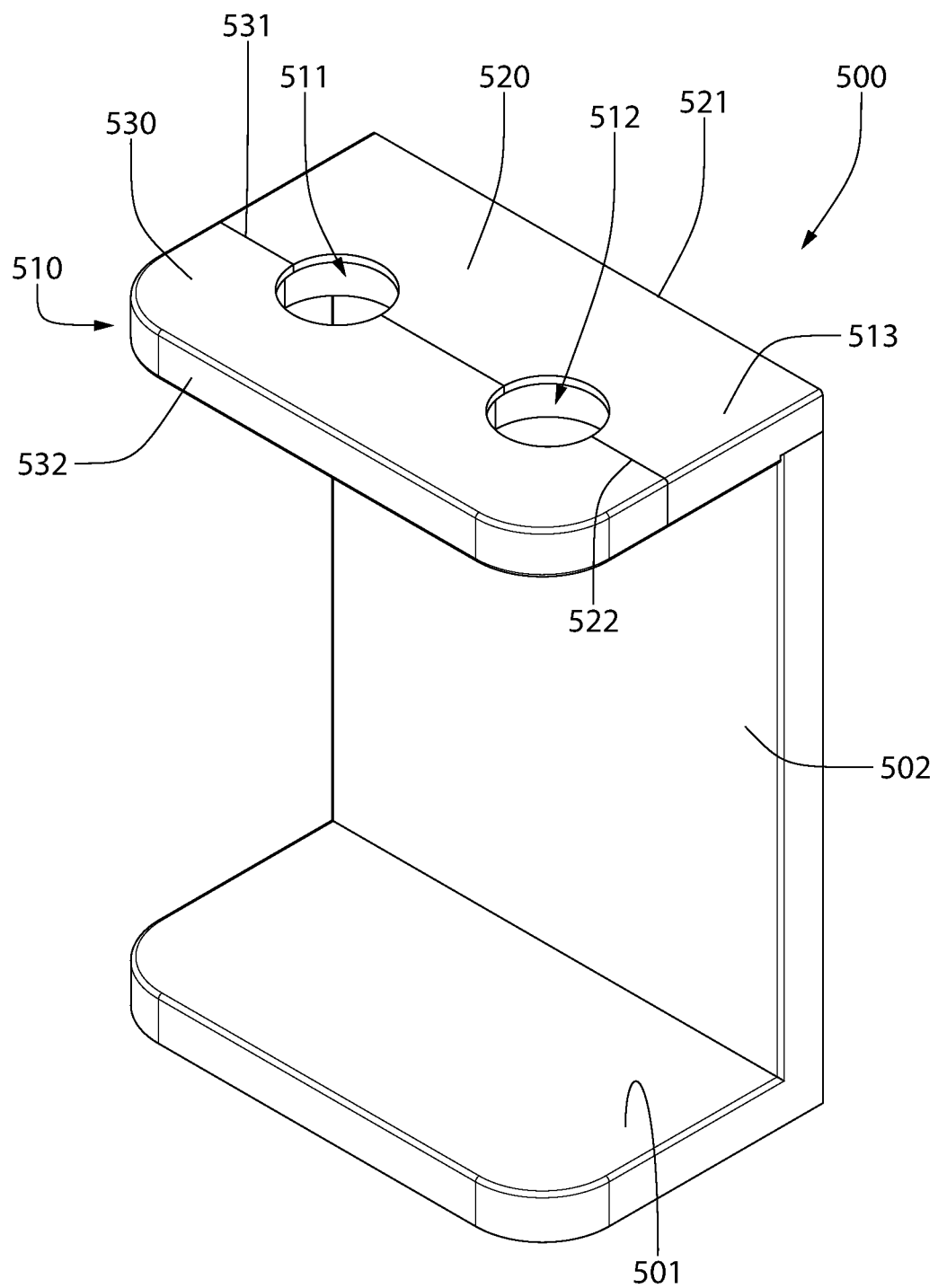
FIG. 14 is a top, front perspective view of an adjustable holder in accordance with another embodiment of the present invention, with a clamp portion thereof in a closed state.
Figure 16:
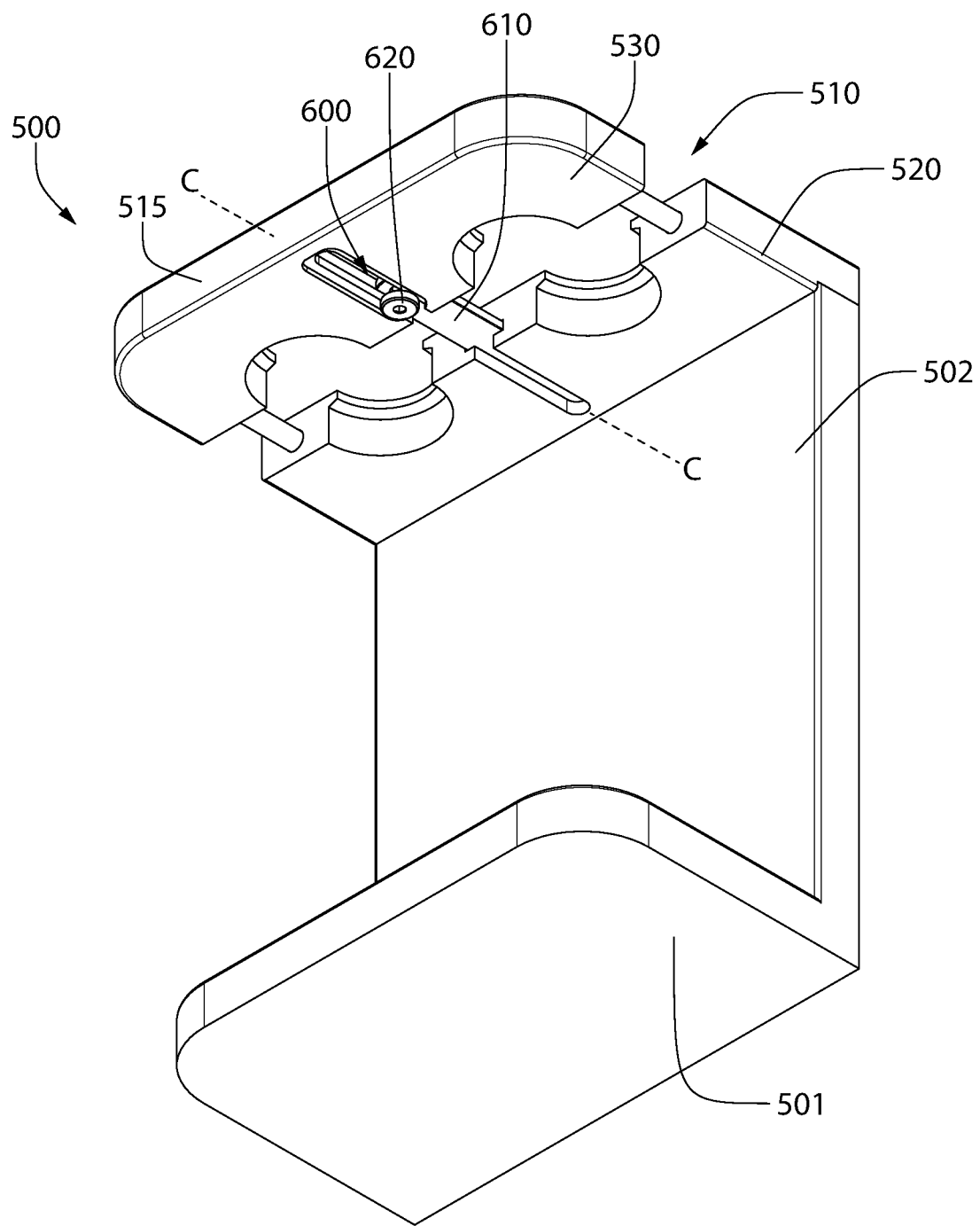
FIG. 16 is a bottom, front perspective view of the adjustable holder of FIG. 14, with the clamp portion thereof in an open state.

Referring to FIGS. 14 and 16, an adjustable holder 500 is illustrated in accordance with another embodiment of the present invention. The adjustable holder 500 is very similar to the adjustable holder 100, and thus the description of the adjustable holder 100 is applicable to the adjustable holder 500 with the exception of the differences noted herein. The main distinction is the structure of the locking assembly (i.e., connection members and locking members) and the structure of the channels/grooves in the clamp portion within which the connection members are located. While a brief discussion of the other features is provided below, it should be appreciated that the description above is also applicable as it may include additional details not recited below in the interest of brevity.

The adjustable holder 500 may comprise a bottom portion 501, a back portion 502, and a clamp portion 510. The back portion 502 may comprise a bottom end and a top end. The bottom portion 501 may be coupled to and may extend perpendicularly from the bottom end of the back portion 502. The clamp portion 510 may be coupled to and may extend perpendicularly from the top end of the back portion 502. The clamp portion 510 may be spaced apart from the bottom portion 501. The back portion 502, the bottom portion 501, and a first part of the clamp portion 510 may be formed integrally or may be formed separately and affixed together using adhesives, bonding techniques, or the like.

In use, a bottom of a container may rest atop of the bottom portion 501 and a top part of the container may protrude through the openings in the clamp portion 510. In some embodiments, the bottom portion 501 may be omitted. In some embodiments, the back portion 502 may be omitted. The inventive features described herein relate mainly to the clamp portion 510. The bottom, back, and clamp portions 510 may be formed from a brittle material, such as a solid surface material, quartz, marble, or granite.

Figure 15:
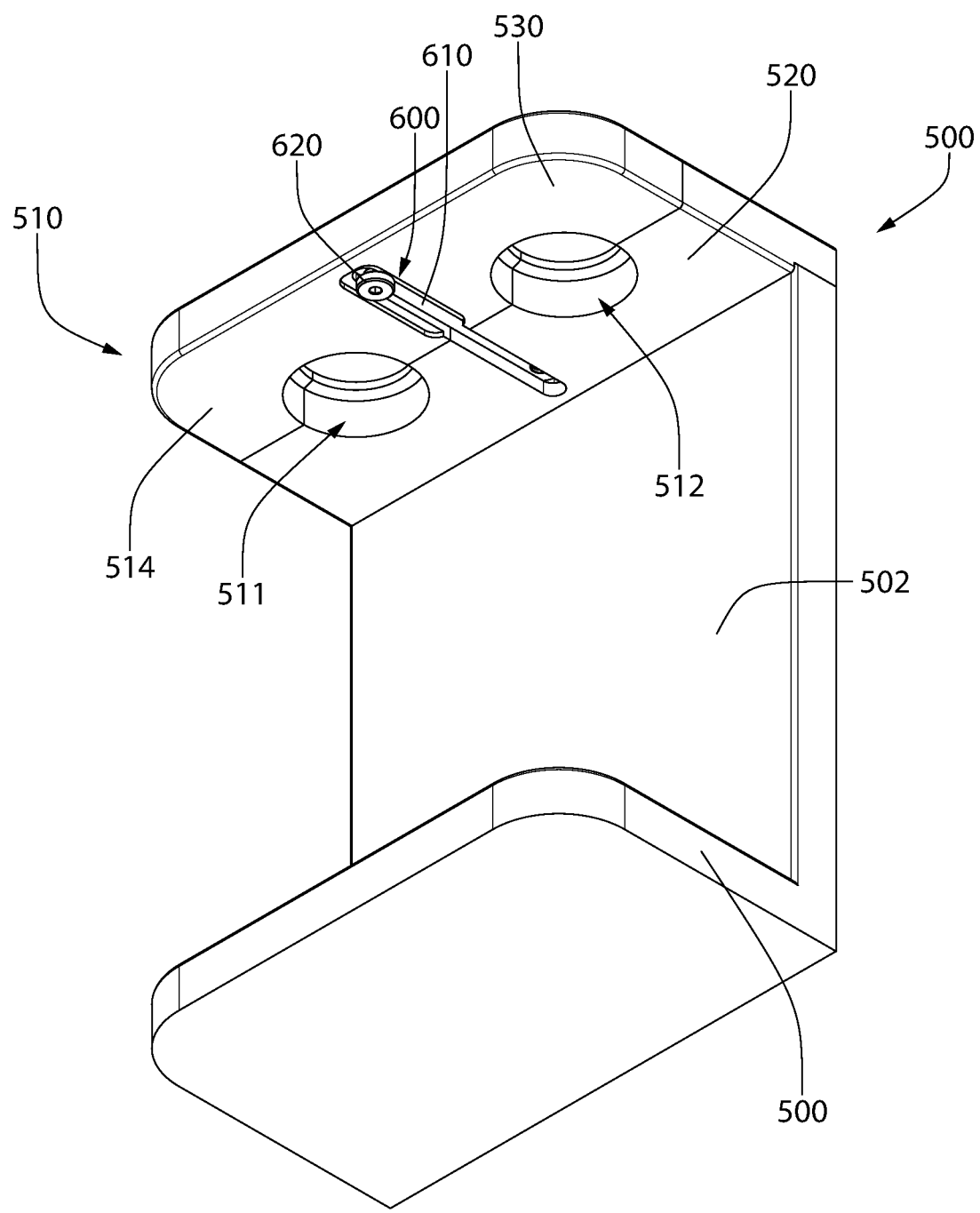
FIG. 15 is a bottom, front perspective view of the adjustable holder of FIG. 14.

The clamp portion 510 comprises a first part 520 that is coupled directly to the back portion 502 and a second part 530 that is movably coupled to the first part 520. The first part 520 comprises a rear edge 521 that is coupled directly to the back portion 502 and a front edge 522 opposite the rear edge 521. The second part 530 comprises a rear edge 531 and a front edge 532, with the front edge 532 forming a distal-most edge of the clamp portion 510. The first part 520 may be fixedly coupled to the back portion 502 such that the first part 520 is non-movable relative to the back portion 502. The second part 530 may be movable relative to the first part 520 as described herein. FIGS. 14 and 15 illustrate the clamp portion 510 in a closed state, in which the rear edge 531 of the second part 530 is adjacent to or abuts the front edge 522 of the first part 520. When the clamp portion 510 is in the closed state, the clamp portion 510 comprises first and second apertures 511, 512 that extend from a top surface 513 of the clamp portion 510 to a bottom surface 514 of the clamp portion 510. Portions of a container supported by the adjustable holder 500 may protrude through the first and second apertures 511, 512 as described above.

As shown in FIG. 15, the adjustable holder 500 may comprise a locking assembly 600 to lock the clamp portion 510 of the adjustable holder 500 in the closed state. The locking assembly 600 may also be used to lock the clamp portion 510 in the open state, or in an intermediate state between the open and closed states. The locking assembly 600 may comprise a connection member 610 and a locking member 620. Additional details regarding the locking assembly 600 will be provided below.

FIG. 16 illustrates the adjustable holder 500 with the clamp portion 510 in the open state. When the locking assembly 600 is altered into an unlocked state, the second part 530 of the clamp portion 510 may be configured to move relative to the first part 520 of the clamp portion 510. The clamp portion 510 may extend from the back portion 502 to a distal end 515 of the clamp portion 510 in a direction of a longitudinal axis C-C. The second part 530 of the clamp portion 510 may be configured to move away from the first part 520 of the clamp portion 510 in the direction of the longitudinal axis C-C to alter the clamp portion 510 from the closed state to the open state, and then the second part 530 of the clamp portion 510 may be configured to move towards the first part 520 of the clamp portion 510 in the direction of the longitudinal axis C-C to alter the clamp portion 510 from the open state to the closed state. When the locking assembly 600 is altered into the locked state, the second part 530 may be unable to move relative to the first part 520 between the open and closed states. The second part 530 may not move relative to the first part 520 in any direction other than in opposite directions parallel to the longitudinal axis C-C. Thus, the second part 530 may not pivot, rotate, move upwardly/downwardly, or the like relative to the first part 520 in some embodiments.

Figure 17A:
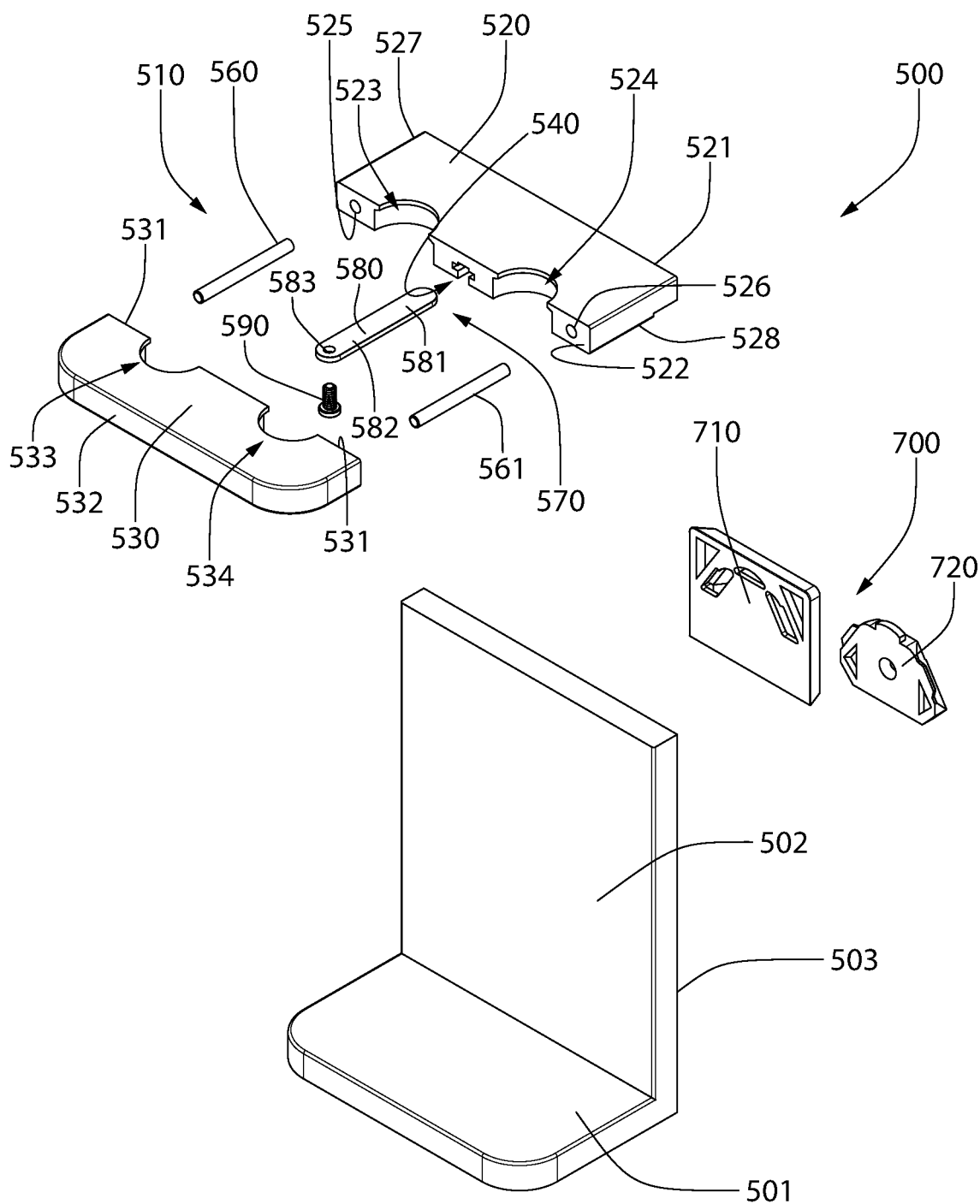
FIG. 17A is a top, front perspective exploded view of the adjustable holder of FIG. 14.
Figure 17B:
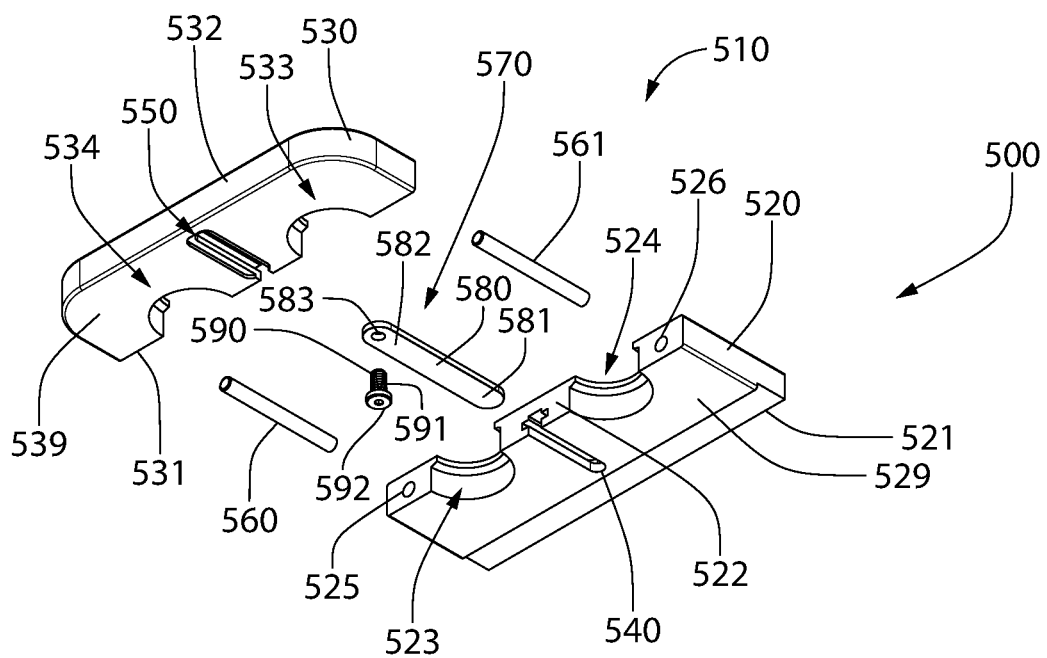
FIG. 17B is a bottom, front perspective exploded view of the adjustable holder of FIG. 14.
Figure 17B:
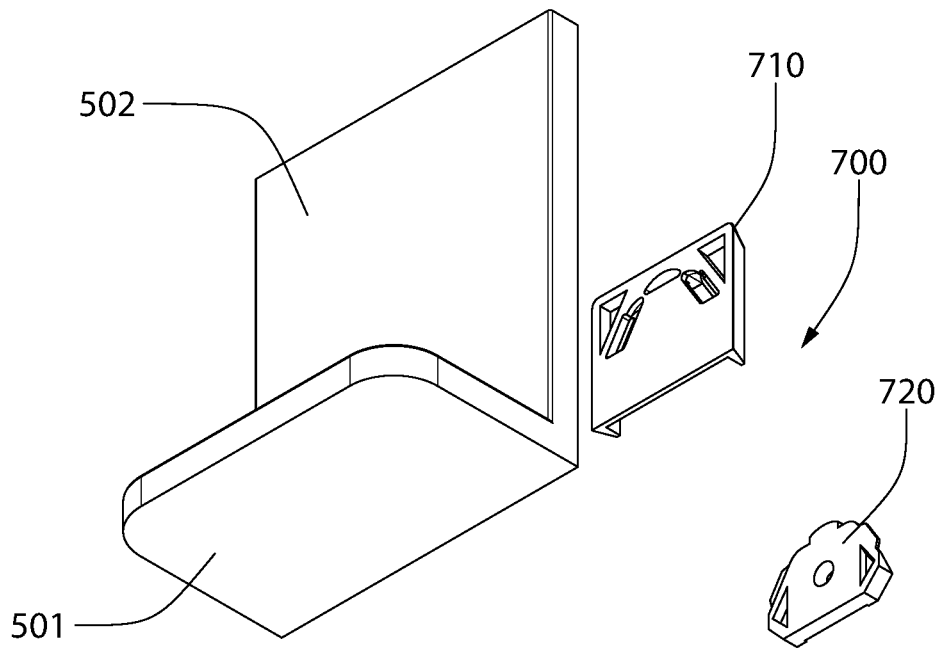

Referring to FIGS. 17A and 17B, the adjustable holder 500 and its component parts will be described in greater detail. As noted above, the adjustable holder 500 may comprise the bottom portion 501 and the back portion 502. The bottom and back portions 501, 502 may be integrally connected, or they may be separate components which are coupled together using any desired technique including adhesives, fasteners, welding, or the like, depending on the material. When brittle materials such as those mentioned above are used, the bottom and back portions 501, 502 may be coupled together with an adhesive material, such as an epoxy or the like.

A mounting assembly 700 may be used to mount the adjustable holder 500 to a support structure or support surface (i.e., a wall or the like). The mounting assembly 700 may comprise a first mounting component (or mounting bracket) 710 configured to be coupled to a rear surface 503 of the back portion 502 and a second mounting component 720 configured to be coupled to the support structure. The first and second mounting components 710, 720 may be configured to mate with one another to mount the adjustable holder 500 to the support structure. The first mounting component 710 may be coupled directly to the rear surface 503 of the back portion 502 using any desired techniques, including fasteners, adhesives, epoxies, or the like. When the back portion 502 is formed from a brittle material, adhesive may be used to couple the first mounting component 710 to the rear surface 503 of the back portion 502. In some embodiments, the rear surface 503 of the back portion 502 may comprise a recess within which the first mounting component 710 may at least partially nest.

The first part 520 of the clamp portion 510 may comprise a first front recess 523 formed in the front edge 522 and a second front recess 524 formed in the front edge 522. The first and second front recesses 523, 524 may be semicircular shaped recesses, although in other embodiments the first and second front recesses 523, 524 may have other shapes. The first part 520 of the clamp portion 510 may comprise a first alignment channel 525 that extends from an opening in the front edge 522 towards the rear edge 521 and a second alignment channel 526 that extends from an opening in the front edge 522 towards the rear edge 521. The first and second alignment channels 525, 526 may be cylindrical shaped channels that are open only at the front edge 522. The first and second alignment channels 525, 526 may not extend through to the rear edge 521, but may instead terminate at a wall that is offset from the rear edge 521 in a direction towards the front edge 522. The first alignment channel 525 may be located adjacent to a first lateral side 527 of the first part 520 and the second alignment channel 526 may be located adjacent to a second lateral side 528 of the first part 520. The first and second front recesses 523, 524 may be located between the first and second alignment channels 525, 526.

The first part 520 of the clamp portion 510 may further comprise a first locking channel 540 that extends from the front edge 522 of the first part 520 towards the rear edge 521 of the first part 520. The first locking channel 540 may be open at the front edge 522. The first locking channel 540 may also be open along a bottom surface 529 of the first part 520.

The second part 530 of the clamp portion 510 may comprise a first rear recess 533 and a second rear recess 534 in the rear edge 531. The first and second rear recesses 533, 534 may be semicircular, although they may take on other shapes in other embodiments. The second part 530 may also include first and second alignment channels 535, 536 (see FIG. 18) that extend from an opening in the rear edge 531 towards the front edge 532. The first and second alignment channels 535, 536 may be open only along the rear edge 531 of the second part 530. When the clamp portion 510 is assembled, the first and second rear recesses 533, 534 in the rear edge 531 of the second part 530 may be aligned with the first and second front recesses 523, 524 in the front edge 522 of the first part 520 so that when the clamp portion 510 is in the closed state the front and rear recesses 523, 524, 533, 534 collectively form the apertures 511, 512. Similarly, when the clamp portion 510 is assembled, the alignment channels 525, 526 in the first part 520 may be aligned with the alignment channels 535, 536 in the second part 530.

The second part 530 of the clamp portion 510 further comprises a second locking channel 550 that extends from the rear edge 531 of the second part 530 towards the front edge 532 of the second part. The second locking channel 550 may be open at the rear edge 531 of the second part 530. The second locking channel 550 may further be open along a bottom surface 539 of the second part 530. When the clamp portion 510 is assembled, the first and second locking channels 540, 550 may be aligned with one another.

The adjustable holder may further comprise one or more alignment members 560, 561. In the exemplified embodiment, there are two of the alignment members 560 561. The alignment members 560, 561 may be cylindrical rod-shaped elements as shown, although the shape of the alignment members 560, 561 is not to be limiting of the invention in all embodiments. The alignment members 560, 561 could take on other shapes including having square or triangular or other polygonal shaped cross-sectional areas. One of the alignment members 560 is configured to be positioned within the first alignment channel 525 of the first part 520 and the first alignment channel 535 of the second part 530 and the other one of the alignment members 561 is configured to be positioned within the second alignment channel 526 of the first part 520 and the second alignment channel 536 of the second part 530. Thus, the alignment member 560 comprises a first portion that is positioned within the first alignment channel 525 of the first part 520 and a second portion that is positioned within the first alignment channel 535 of the second part 530. The alignment member 561 comprises a first portion that is positioned within the second alignment channel 526 of the first part 520 and a second portion that is positioned within the second alignment channel 536 of the second part 530. The alignment members 560, 561 may be fixedly coupled to the first part 520 such as by adhesives or the like, although this is not required and the alignment members 560, 561 may be positioned within the first and second alignment channels 525, 526 of the first part 520 without being fixed thereto. The first and second alignment members 560, 561 may be positioned within the first and second alignment channels 535, 536 of the second part 530 without being fixed thereto, such that the second part 530 may be configured to move or slide relative to the first and second alignment members 560, 561.

The adjustable holder 500 may comprise a locking assembly 570. The locking assembly 570 may comprise a connection member 580 and a locking member 590. The connection member 580 may be a flat plate, although the invention is not to be so limited in all embodiments. The connection member 580 may comprise a first portion 581 that is positioned within the first locking channel 540 of the first part 520 and a second portion 582 that is positioned within the second locking channel 550 of the second part 530. The connection member 580 may be fixed to the first part 520. Specifically, the connection member 580 may be fixed to the first part 520 by an adhesive such as an epoxy. Alternatively, the connection member 580 may be fixed to the first part 520 with a fastener such as a screw or the like.

The second portion 582 of the connection member 580 may comprise an aperture 583 that extends from a top surface of the connection member 580 to a bottom surface of the connection member 580. The locking member 590 may be configured to be inserted into and through the aperture 583 in the connection member 580. Thus, the first portion 581 of the connection member 580 may be fixed to the first part 520 of the clamp portion 510 within the first locking channel 540. The second portion 582 of the connection member 580 may be positioned within the second locking channel 550. When the locking member 590 is inserted through the aperture 583 in the connection member 580, the locking member 590 may be altered between a locked state whereby the locking member 590 engages the floor of the second locking channel 550, thereby preventing the second part 530 of the clamp portion 510 from moving relative to the first part 520 of the clamp portion 510, and an unlocked state whereby the second part 530 of the clamp portion 510 is capable of moving relative to the first part 520 of the clamp portion 510.

Figure 18:
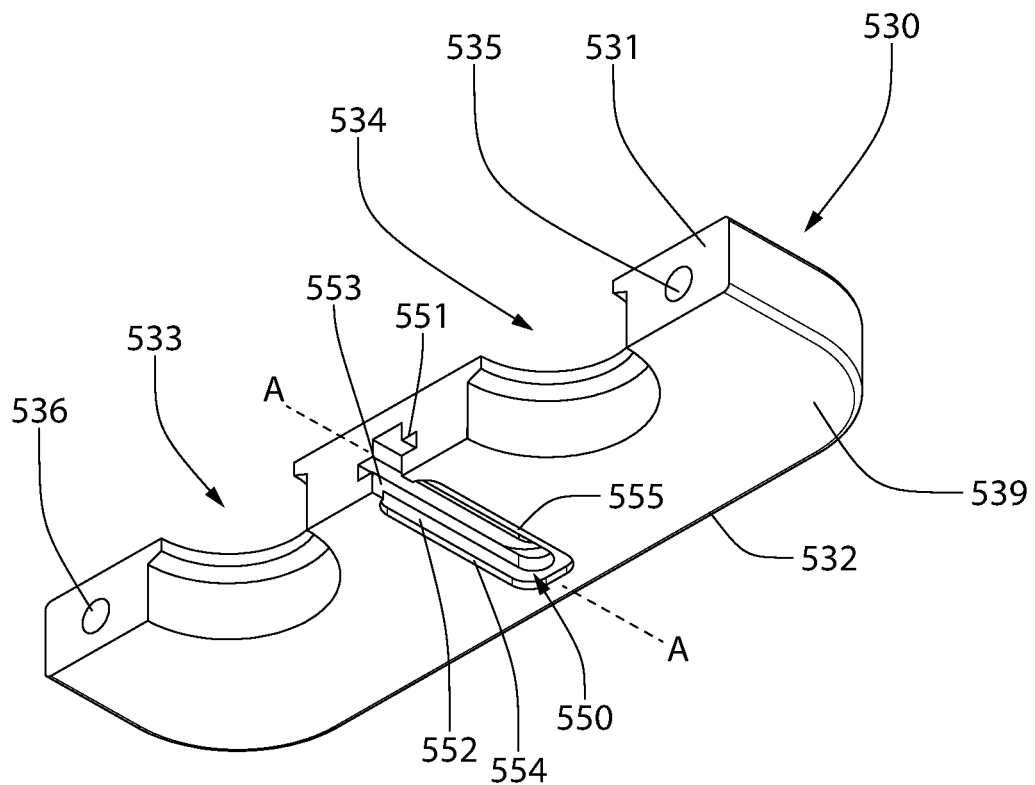
FIG. 18 is a bottom perspective view of a second part of the clamp portion of the adjustable holder of FIG. 14.

Referring to FIG. 18, the second part 530 of the clamp portion 510 is illustrated. The second locking channel 550 comprises an upper section 551, a lower section 552, and an intermediate section 553. The intermediate section 553 has a width that is smaller than the widths of the upper and lower sections 551, 552. The second portion 582 of the connection member 580 is positioned within the upper section 551 of the second locking channel 550. The locking member 590 may be a threaded fastener. As shown in FIGS. 17A and 17B, the locking member 590 may comprise a post portion 591 and a flange portion 592. The locking member 590 may be coupled to the connection member 580 such that the post portion 591 extends through the aperture 583 and into the upper section 551 of the second locking channel 550. The flange portion 592 of the locking member 590 may be located adjacent to a lower surface of the connection member 580 such that the flange portion 592 of the locking member 590 nests within the lower section 552 of the second locking channel 550.

The second locking channel 550 may extend along a second channel axis A-A. The lower section 552 of the second locking channel 550 may be defined by a first sidewall 554 located on a first side of the second channel axis A-A and a second sidewall 555 located on a second side of the second channel axis A-A. The first and second sidewalls 554, 555 may comprise distal portions that converge towards one another moving in a direction towards the rear edge 531 of the second part 530 of the clamp portion 510. Thus, the width of the lower section 552 of the second locking channel 550 may decrease along the distal portions of the first and second sidewalls 554, 555. When the adjustable holder 500 is assembled, the flange portion 592 of the locking member 590 is located within the lower section 552 of the second locking channel 550. As the second part 530 moves relative to the first part 520, the location of the flange portion 592 of the locking member 590 within the lower section 552 of the second locking channel 550 changes. The converging distal portions of the first and second sidewalls 554, 555 may prevent the flange portion 592 of the locking member 590 from being able to slide out of the second locking channel 550 entirely. Thus, the distal portions of the first and second sidewalls 554, 555 may form a stopper feature that maintains the coupling between the first and second parts 520, 530 so long as the locking member 590 remains coupled to the connection member 580.

Figure 19:
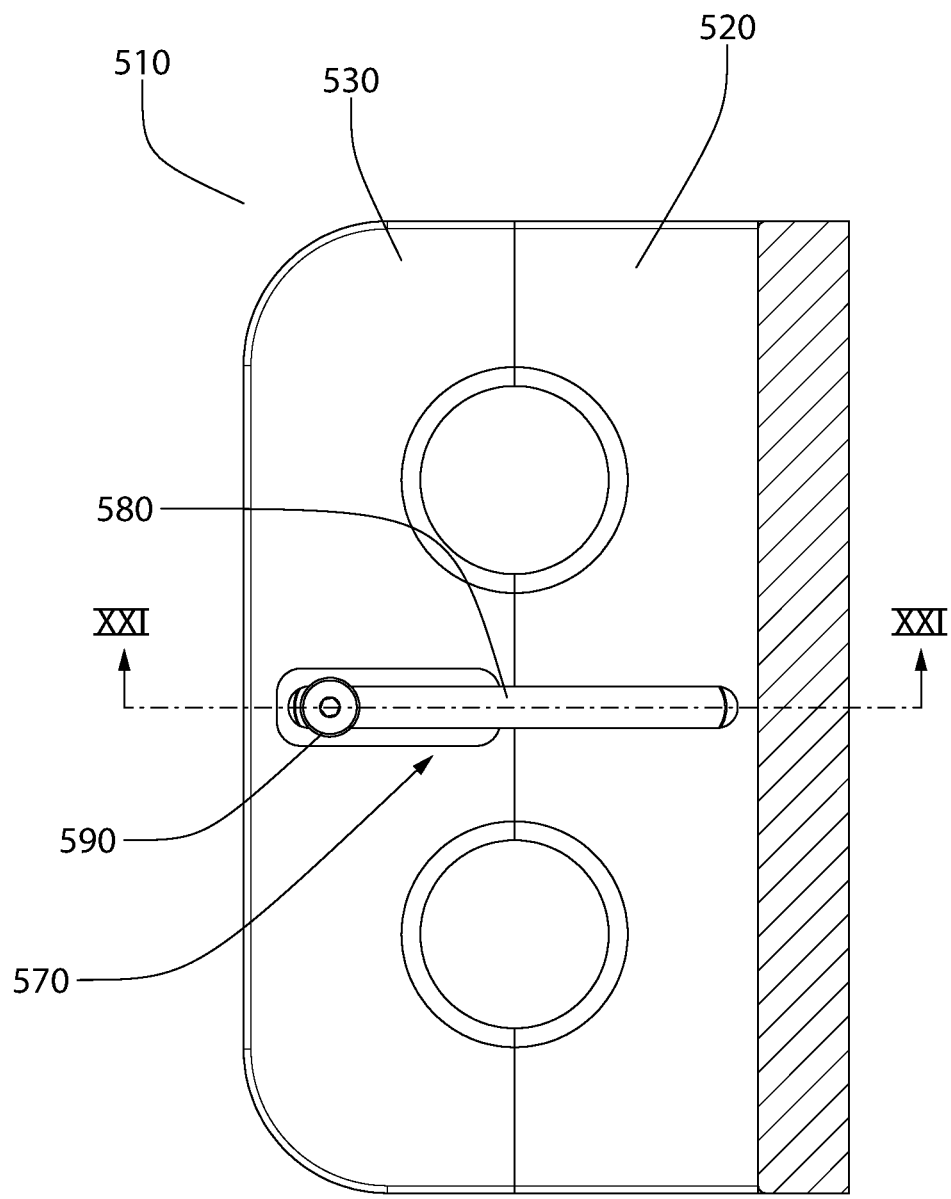
FIG. 19 is a bottom view of the clamp portion of the adjustable holder of FIG. 14 in the closed state.
Figure 20:
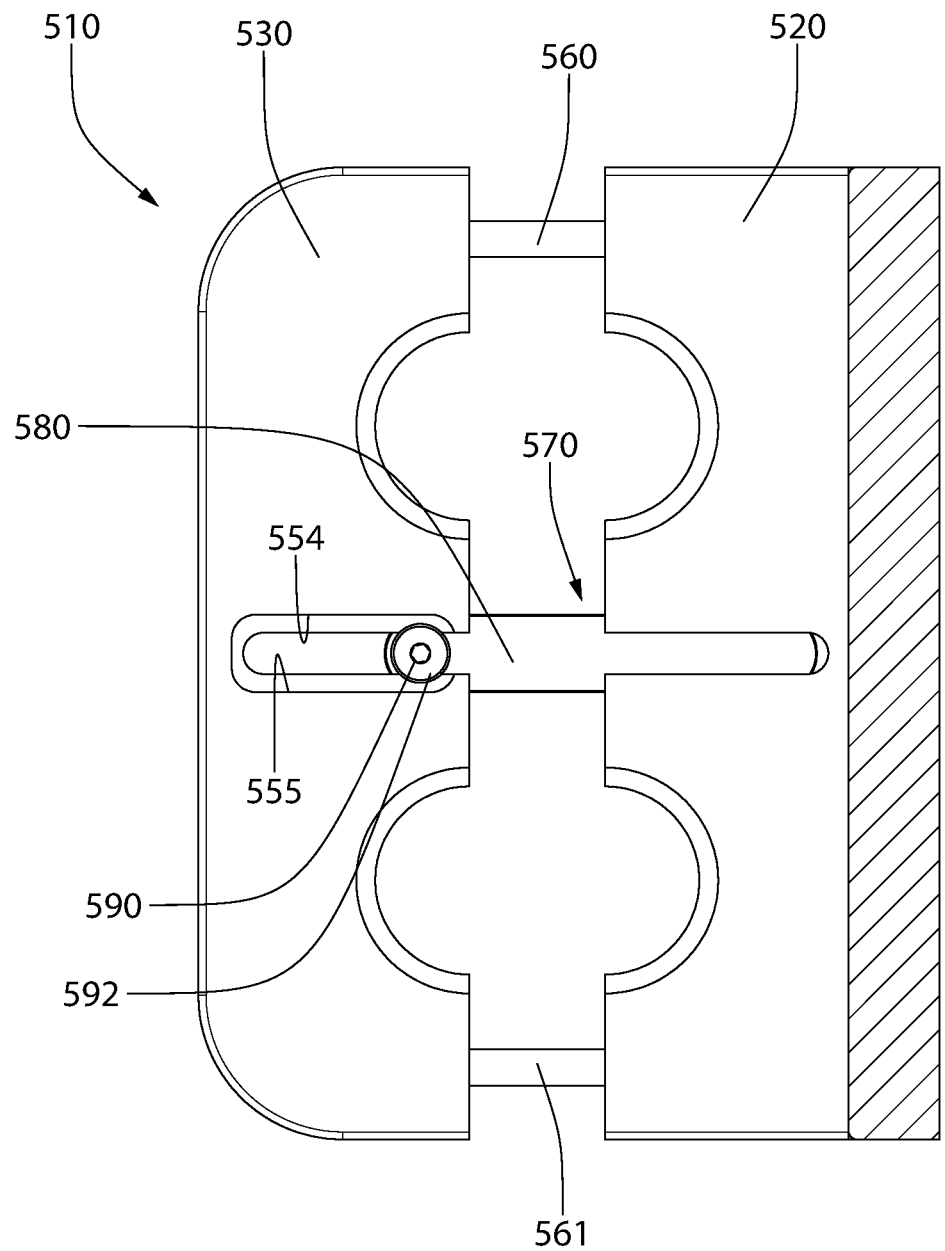
FIG. 20 is a bottom view of the clamp portion of the adjustable holder of FIG. 14 in the open state.

Referring to FIGS. 19 and 20, a top view of the clamp portion 510 is provided in the closed state (FIG. 19) and in the open state (FIG. 20). As seen in FIG. 20, the diameter of the flange portion 592 of the locking member 590 is larger than the space between the distal portions of the first and second sidewalls 554, 555. As such, the flange portion 592 of the locking member 590 cannot pass through the space between the distal portions of the first and second sidewalls 554, 555. Thus, as long as the locking member 590 remains coupled to the connection member 580, the second part 530 will remain coupled to the first part 520. However, if the locking member 590 were to be completely detached from the connection member 580, then it may be possible to completely detach the second part 530 of the clamp portion 510 from the first part 520 of the clamp portion 510.

Figure 21:
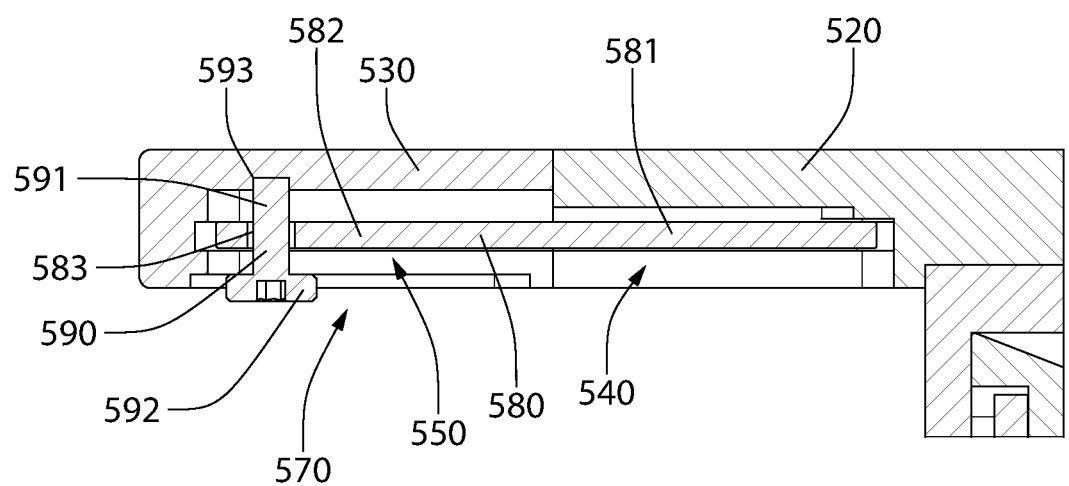
FIG. 21 is a cross-sectional view taken along line XXI-XXI of FIG. 19.

FIG. 21 is a cross-sectional view illustrating the locking member 590 in the locked state. Specifically, the locking member 590 is engaged against the floor of the second locking channel 550 of the second part 530 which makes it so that the second part 530 cannot move relative to the first part 520. A distal portion of the post portion 591 of the locking member 590 may nest inside of a pocket 593 formed into the floor of the second locking channel 550 when in the locked state, although this is not required in all embodiments. A user may alter the locking member 590 from the locked state to the unlocked state, such as by rotating the locking member 590, to disengage the locking member 590 from the floor of the second locking channel 550. When the locking member 590 is no longer engaged with the floor of the second locking channel 550, the second part 530 may be able to move relative to the first part 520.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An adjustable holder configured to support a fluid dispensing container, the adjustable holder comprising:
 a clamp portion comprising:
  a first part comprising a front edge, a rear edge, at least one front recess in the front edge, and a first locking channel extending from the front edge towards the rear edge; and
  a second part comprising a front edge, a rear edge, at least one rear recess in the rear edge, and a second locking channel extending from the rear edge towards the front edge, wherein the second locking channel is open along a bottom surface of the second part of the clamp portion;
 a locking assembly comprising:
  a connection member comprising a first portion that is located within the first locking channel and a second portion that is located within the second locking channel; and
  a locking member accessible along the bottom surface of the second part of the clamp portion, the locking member being alterable between: (1) a locked state whereby the locking member prevents movement of the second part of the clamp portion relative to the first part of the clamp portion; and (2) an unlocked state whereby the second part of the clamp portion is permitted to move relative to the first part of the clamp portion between: (a) a closed state wherein the rear edge of the second part abuts the front edge of the first part and the at least one front and rear recesses are aligned to define a closed geometry aperture that extends from a top of the clamp portion to a bottom of the clamp portion; and (b) an open state wherein the rear edge of the second part is spaced from the front edge of the first part to facilitate replacement of the fluid dispensing container; and
 wherein the locking member comprises a threaded fastener that extends through an aperture in the second portion of the connection member and engages a surface of the second part of the clamp portion when in the locked state, the threaded fastener being configured to be rotated relative to the clamp portion to alter the locking member between the locked and unlocked states.

2. The adjustable holder according to claim 1 wherein the first and second parts of the clamp portion are formed from a brittle material selected from the group consisting of solid surface, marble, quartz, and granite.

3. The adjustable holder according to claim 1 further comprising:
 a bottom portion configured to support a bottom end of the fluid dispensing container;
 a back portion fixedly coupled to the bottom portion and to the first part of the clamp portion; and
 a mounting bracket coupled to a rear surface of the back portion for mounting the adjustable holder to a support surface.

4. The adjustable holder according to claim 1 further comprising:
 at least one first alignment channel extending from the front edge of the first part of the clamp portion towards the rear edge of the first part of the clamp portion;

at least one second alignment channel extending from the rear edge of the second part of the clamp portion towards the front edge of the second part of the clamp portion;

one or more alignment members, each of the one or more alignment members comprising a first portion positioned within one of the at least one first alignment channels and a second portion positioned within one of the at least one second alignment channels; and wherein the second part of the clamp portion moves relative to the one or more alignment members as the second part of the clamp portion moves between the open and closed states.

5. The adjustable holder according to claim 4 wherein the at least one first alignment channel is open only at the front edge of the first part and wherein the at least one second alignment channel is open only at the rear edge of the second part.

6. The adjustable holder according to claim 4 wherein the at least one first alignment channel comprises at least a pair of the first alignment channels and wherein the at least one second alignment channel comprises at least a pair of the second alignment channels, and wherein the at least one front recess is located between respective ones of the pair of the first alignment channels and wherein the at least one rear recess is located between respective ones of the pair of the second alignment channels.

7. The adjustable holder according to claim 6 further comprising:

the at least one front recess of the first part comprising a first front recess and a second front recess;

the at least one rear recess of the second part comprising a first rear recess and a second rear recess, the first front and rear recesses being aligned to form a first closed geometry aperture when the clamp portion is in the closed state and the second front and rear recesses being aligned to form a second closed geometry aperture when the clamp portion is in the closed state;

wherein the first and second front recesses are located between the respective ones of the pair of the first alignment channels and wherein the first and second rear recesses are located between the respective ones of the pair of the second alignment channels; and wherein the first locking channel is located between the first and second front recesses and the second locking channel is located between the first and second rear recesses.

8. The adjustable holder according to claim 1 wherein the locking member comprises a post portion that is located within the second locking channel and that is configured to slide within the second locking channel when in the unlocked state and a flange portion, wherein the second locking channel extends along a second channel axis and comprises a first axial portion located adjacent to the front edge of the second part of the clamp portion and having a first minimum width and a second axial portion located adjacent to the rear edge of the second part of the clamp portion and having a second minimum width that is less than the first minimum width, the second minimum width being less than a diameter of the flange portion to prevent the locking member from sliding through the second axial section of the second locking channel.

9. An adjustable holder configured to support a fluid dispensing container, the adjustable holder comprising:

a clamp portion comprising:

a first part comprising a front edge, a rear edge, at least one front recess in the front edge, and a first locking channel extending from the front edge towards the rear edge; and a second part comprising a front edge, a rear edge, at least one rear recess in the rear edge, and a second locking channel extending from the rear edge towards the front edge;

a locking assembly comprising:

a connection member comprising a first portion that is located within the first locking channel and a second portion that is located within the second locking channel; and a locking member accessible along a bottom surface of the clamp portion, the locking member being alterable between: (1) a locked state whereby the locking member prevents movement of the second part of the clamp portion relative to the first part of the clamp portion; and (2) an unlocked state whereby the second part of the clamp portion is permitted to move relative to the first part of the clamp portion between: (a) a closed state wherein the rear edge of the second part abuts the front edge of the first part and the at least one front and rear recesses are aligned to define a closed geometry aperture that extends from a top of the clamp portion to a bottom of the clamp portion; and (b) an open state wherein the rear edge of the second part is spaced from the front edge of the first part to facilitate replacement of the fluid dispensing container; and wherein the second locking channel extends along a second channel axis, the second locking channel defined between a first sidewall located on a first side of the second channel axis and a second sidewall located on a second side of the second channel axis, the first and second sidewalls comprising distal portions that converge towards one another moving in a direction towards the rear edge of the second part of the clamp portion to prevent the locking member from sliding through a rear opening of the second locking channel that is located on the rear edge of the second part of the clamp portion.

10. The adjustable holder according to claim 1 wherein the first portion of the connection member is fixedly coupled to the first part of the clamp portion so that the first part of the clamp portion cannot move relative to the connection member and wherein the second portion of the connection member is not fixedly coupled to the second part of the clamp portion to permit the second part of the clamp portion to move relative to the connection member between the open and closed states when the locking member is in the unlocked state.

11. The adjustable holder according to claim 1 wherein the connection member is a flat plate comprising a top surface, a bottom surface, and the aperture extending from the top surface to the bottom surface, and wherein the locking member comprises a post portion that extends through the aperture and into the second locking channel and a flange portion that is located adjacent to the bottom surface of the flat plate, and wherein the first portion of the connection member is fixedly coupled to the first part of the clamp portion with an adhesive.

12. The adjustable holder according to claim 1 wherein the second locking channel is a T-shaped channel such that the second portion of the connection member is located within an upper portion of the T-shaped channel and the locking member is at least partially located within a lower portion of the T-shaped channel.

13. An adjustable holder configured to support a fluid dispensing container, the adjustable holder comprising:
a clamp portion comprising:
  a first part comprising a front edge, a rear edge, at least one front recess in the front edge, a first locking channel extending from the front edge towards the rear edge, and a first alignment channel extending from the front edge towards the rear edge, the first locking channel and the first alignment channel being open at the front edge; and
  a second part comprising a front edge, a rear edge, at least one rear recess in the rear edge, a second locking channel extending from the rear edge towards the front edge, and a second alignment channel extending from the rear edge towards the front edge, the second locking channel and the second alignment channel being open at the rear edge;
an alignment member comprising a first portion positioned within the first alignment channel of the first part and a second portion positioned within the second alignment channel of the second part; and
a locking assembly comprising:
  a connection member comprising a first portion that is located within the first locking channel and a second portion that is located within the second locking channel; and
  a locking member that is alterable between: (1) a locked state whereby the locking assembly prevents the second part of the clamp portion from moving relative to the first part of the clamp portion and relative to the locking member; and (2) an unlocked state whereby the second part of the clamp portion is configured to move relative to the first part of the clamp portion and relative to the locking member.

14. The adjustable holder according to claim 13 wherein when the locking member is in the unlocked state, the second part of the clamp portion is configured to move relative to the first part of the clamp portion between: (a) a closed state wherein the rear edge of the second part abuts the front edge of the first part and the at least one front and rear recesses are aligned to define a closed geometry aperture that extends from a top of the clamp portion to a bottom of the clamp portion; and (b) an open state wherein the rear edge of the second part is spaced from the front edge of the first part to facilitate replacement of the fluid dispensing container.

15. The adjustable holder according to claim 14 wherein the first locking channel is open along a bottom surface of the first part of the clamp portion and the second locking channel is open along a bottom surface of the second part of the clamp portion, and wherein the first and second alignment channels are enclosed channels that are only open at the front and rear of the first and second parts of the clamp portion, respectively.

16. The adjustable holder according to claim 13 wherein the first and second parts of the clamp portion are formed from a brittle material selected from the group consisting of solid surface, marble, quartz, and granite.

17. The adjustable holder according to claim 13 further comprising:
  the at least one front recess comprising a first front recess and a second front recess, the first locking channel being located between the first and second front recesses, and further comprising a third alignment channel extending from the front edge of the first part towards the rear edge of the first part, the first and second front recesses being located between the first and third alignment channels;
  the at least one rear recess comprising a first rear recess and a second rear recess, the second locking channel being located between the first and second rear recesses, and further comprising a fourth alignment channel extending from the rear edge of the second part towards the front edge of the second part, the first and second rear recesses being located between the second and fourth alignment channels.

18. The adjustable holder according to claim 17 further comprising a second alignment member comprising a first portion positioned within the third alignment channel of the first part and a second portion positioned within the fourth alignment channel of the second part.

19. The adjustable holder according to claim 13 wherein the alignment member is rod-shaped and wherein the locking member is a plate that is fixedly coupled to the first part of the clamp portion, the second portion of the locking member comprising an aperture, and wherein the locking member comprises a fastener comprising a post portion that extends through the aperture in the second portion of the locking member, wherein a distal end of the post portion of the fastener is configured to engage a floor of the second locking channel when in the locked state, and wherein the fastener does not engage the floor of the second locking channel when in the unlocked state.

* * * * *